United States Patent
Cramer et al.

(10) Patent No.: US 11,914,929 B2
(45) Date of Patent: *Feb. 27, 2024

(54) MULTI-BODY COMPONENT OPTIMIZATION

(71) Applicant: Autodesk, Inc., San Francisco, CA (US)

(72) Inventors: Brandon Stewart Cramer, Detroit, MI (US); Michael Grau, Birmingham, MI (US); Nigel Jed Wesley Morris, Toronto (CA)

(73) Assignee: Autodesk, Inc., San Francisco, CA (US)

( * ) Notice: Subject to any disclaimer, the term of this patent is extended or adjusted under 35 U.S.C. 154(b) by 138 days.

This patent is subject to a terminal disclaimer.

(21) Appl. No.: 17/710,829

(22) Filed: Mar. 31, 2022

(65) Prior Publication Data

US 2022/0222389 A1  Jul. 14, 2022

Related U.S. Application Data

(63) Continuation of application No. 16/913,495, filed on Jun. 26, 2020, now Pat. No. 11,295,041.

(51) Int. Cl.
*G06G 7/48* (2006.01)
*G06F 30/10* (2020.01)
(Continued)

(52) U.S. Cl.
CPC .............. *G06F 30/10* (2020.01); *G06F 30/20* (2020.01); *G06F 2111/04* (2020.01); *G06F 2119/18* (2020.01)

(58) Field of Classification Search
CPC ...... G06F 30/20; G06F 30/10; G06F 2111/04; G06F 2119/18
(Continued)

(56) References Cited

U.S. PATENT DOCUMENTS 10,635,088 B1   4/2020   Bandara et al.
2001/0033291 A1* 10/2001  Scott ...................... G06T 17/05
                                                   345/629

(Continued)

OTHER PUBLICATIONS

"Topology Optimization R18.0 Feature and Usage Highlights," © 2016 ANSYS, Inc., Mar. 12, 2017, 29 pages.
(Continued)

*Primary Examiner* — Andre Pierre Louis
(74) *Attorney, Agent, or Firm* — Fish & Richardson P.C.

(57) ABSTRACT

Techniques and systems for computer aided design of physical structures using an object splitting design process that optimize manufacturing efficiency are described. A described technique includes splitting, by a computer program, a three dimensional model of an initial object into an up skin region and a down skin region based on an analysis of draft angles along at least one surface of the three dimensional model of the initial object. The technique further includes producing, by the computer program, first and second three dimensional models of respective first and second objects in accordance with the up skin region and the down skin region to create separate first and second physical structures using one or more computer-controlled manufacturing systems such that the first and second physical structures are combinable to form a combined physical structure.

20 Claims, 12 Drawing Sheets

(51) Int. Cl.
  *G06F 30/20*   (2020.01)
  *G06F 119/18*  (2020.01)
  *G06F 111/04*  (2020.01)

(58) Field of Classification Search
  USPC .......................................................... 703/6
  See application file for complete search history.

(56) References Cited

U.S. PATENT DOCUMENTS

| | | | |
|---|---|---|---|
| 2018/0345647 A1 | 12/2018 | Morris et al. | |
| 2018/0349531 A1 | 12/2018 | Morris et al. | |
| 2020/0096978 A1* | 3/2020 | Baker | G05B 19/41865 |
| 2020/0150623 A1 | 5/2020 | Bandara et al. | |
| 2020/0151286 A1 | 5/2020 | Willis et al. | |
| 2020/0298493 A1* | 9/2020 | Wilds | B33Y 30/00 |

OTHER PUBLICATIONS

Arisoy et al., "Design and Topology Optimization of Lattice Structures Using Deformable Implicit Surfaces for Additive Manufacturing," in ASME 2015 International Design Engineering Technical Conferences and Computers and Information in Engineering Conference (2015) 11 pages.

Brackett et al., "Topology Optimization for Additive Manufacturing," in Proceedings of the Solid Freeform Fabrication Symposium (2011) 15 pages.

Dapogny et al., "Geometric Constraints for Shape and Topology Optimization in Architectural Design," Computational Mechanics, Springer-Verlag, 2017, 59(6):933-965. 10.1007/s00466-017-1383-6. hal-01354004v3.

Gibou et al., "A Review of Level-set Methods and Some Recent Applications," Journal of Computational Physics (2018) 353:82-109.

Guest and Zhu, "Casting and Milling Restrictions in Topology Optimization via Projection-based Algorithms," in ASME 2012 International Design Engineering Technical Conferences and Computers and Information in Engineering Conference (2012) 8 pages.

Ikeya and Shimoda, "Multi-objective Free-form Optimization for Shape and Thickness of Shell Structures with Composite Materials," in 11th World Congress on Structural and Multidisciplinary Optimisation (2015) 6 pages.

Joshi et al., "CAD-integrated Topology Optimization (BGCE Honours Project)," Department of Informatics, Technical University of Munich (2016) 77 pages.

Langelaar, "Topology Optimization for Multi-axis Machining," Comput. Methods Appl. Mech. Engrg. (2019) 351:226-252.

Liu et al., "Current and Future Trends in Topology Optimization for Additive Manufacturing," Structural and Multidisciplinary Optimization (2018) 57:2457-2483.

Liu and Ma, "A Survey of Manufacturing Oriented Topology Optimization Methods," Advances in Engineering Software (2016) 100:161-175.

Lu et al., "Build-to-Last: Strength to Weight 3D Printed Objects," ACM Trans. Graph. (2014) 33(4):97:1-97:10.

Nakayama and Shimoda, "Shape-topology Optimization for Designing Shell Structures," in VII European Congress on Computational Methods in Applied Sciences and Engineering (2016) 10 pages.

Sigmund and Maute, "Topology Optimization Approaches—a Comparative Review," Struct. Multidisc. Optim. (2013) 48:1031-1055.

Van Dijk et al., "Level-set Methods for Structural Topology Optimization: a Review," Struct. Multidisc. Optim. (2013) 48:437-472.

Vatanabe et al., "Topology Optimization with Manufacturing Constraints: a Unified Projection-based Approach," Advances in Engineering Software (2016) 100:97-112.

Xia et al., "A Level Set Based Method for the Optimization of Cast Part," Struct. Multidisc. Optim. (2010) 41:735-747.

* cited by examiner

MULTI-BODY COMPONENT OPTIMIZATION

CROSS-REFERENCE TO RELATED APPLICATION

This is a continuation of and claims the benefit of the priority of U.S. application Ser. No. 16/913,495, entitled "MULTI-BODY COMPONENT OPTIMIZATION" and filed on Jun. 26, 2020, which is incorporated herein by reference in its entirety.

BACKGROUND

This specification relates to computer aided design of physical structures, which can be manufactured using additive manufacturing, subtractive manufacturing and/or other manufacturing systems and techniques.

Computer Aided Design (CAD) software has been developed and used to generate three-dimensional (3D) representations of objects, and Computer Aided Manufacturing (CAM) software has been developed and used to manufacture the physical structures of those objects, e.g., using Computer Numerical Control (CNC) manufacturing techniques. CAD software can include or interface with CAM software. Typically, CAD software stores the 3D representations of the geometry of the objects being modeled using a boundary representation (B-Rep) format. A B-Rep model is a set of connected surface elements specifying boundaries between a solid portion and a non-solid portion of the modelled 3D object. In a B-Rep model (often referred to as a B-Rep), geometry is stored in the computer using smooth and precise mathematical surfaces, in contrast to the discrete and approximate surfaces of a mesh model, which can be difficult to work with in a CAD program.

Further, CAD programs have been used in conjunction with additive manufacturing systems and techniques. Additive manufacturing, also known as solid free form fabrication or 3D printing, refers to any manufacturing process where 3D objects are built up from raw material (generally powders, liquids, suspensions, or molten solids) in a series of layers or cross-sections. Examples of additive manufacturing include Fused Filament Fabrication (FFF) and Selective Laser Sintering (SLS). Further, subtractive manufacturing refers to any manufacturing process where 3D objects are created from stock material (generally a "blank" or "workpiece" that is larger than the 3D object) by cutting away portions of the stock material.

In addition, CAD software has been designed so as to perform automatic generation of 3D geometry (generative design) for a part or one or more parts in a larger system of parts to be manufactured. This automated generation of 3D geometry is often limited to a design space specified by a user of the CAD software, and the 3D geometry generation is typically governed by design objectives and constraints, which can be defined by the user of the CAD software or by another party and imported into the CAD software. The design objectives (such as minimizing the waste material or weight of the designed part) can be used to drive the geometry generation process toward better designs. The design constraints can include both structural integrity constraints for individual parts (i.e., a requirement that a part should not fail under the expected structural loading during use of the part) and physical constraints imposed by a larger system (i.e., a requirement that a part not interfere with another part in a system during use). Further, some CAD software has included tools that facilitate 3D geometry enhancements using lattices and skins of various sizes, thicknesses and densities, where lattices are composed of beams or struts that are connected to each other at junctions, and skins are shell structures that overlay or encapsulate the lattices. Such tools allow redesign of a 3D part to be lighter in weight, while still maintaining desired performance characteristics (e.g., stiffness and flexibility).

SUMMARY

This specification describes technologies relating to computer aided design of physical structures using one or more object splitting design processes that optimize manufacturing efficiency. The object splitting design processes can be used in conjunction with one or more generative design processes for additional optimizations. An object splitting design process can split an object into two or more separate objects, the physical structures corresponding to these separate objects can be manufactured and then assembled into a single final structure. The physical structures can be manufactured using additive manufacturing, die casting, injection molding, subtractive manufacturing, and/or other manufacturing systems and techniques. The respective physical structures can be manufactured using the same or different manufacturing systems and techniques to potentially realize manufacturing efficiencies over manufacturing the physical structure for an object that was not split.

In general, one or more aspects of the subject matter described in this specification can be embodied in one or more methods, including: obtaining, by a computer aided design program, an input model of an initial object to be manufactured, the input model providing a three dimensional topology and shape for the initial object; determining, by the computer aided design program based on the three dimensional topology and shape, a three dimensional parting surface to split the initial object into separate objects including a first object and a second object, the parting surface intersects an inflection zone that is situated between up skin and down skin regions of the three dimensional topology and shape; and providing, by the computer aided design program, first and second three dimensional models of the first and second objects in accordance with the three dimensional topology and shape and the parting surface, for use in manufacturing separate first and second physical structures corresponding to the first and second objects using one or more computer-controlled manufacturing systems, where after respective manufacturing, the first and second physical structures are configured to be assembled together to form a combined structure.

This and other methods described herein can be implemented using a non-transitory computer-readable medium encoding a computer aided design program operable to cause one or more data processing apparatus to perform the method(s). In some implementations, a system includes: a non-transitory storage medium having instructions of a computer aided design program stored thereon; and one or more data processing apparatus configured to run the instructions of the computer aided design program to perform the method(s). Further, such systems can include an additive manufacturing machine, or other manufacturing machines, and the one or more data processing apparatus can be configured to run the instructions of the computer aided design program to generate instructions for such machines (e.g., toolpath specifications for the additive manufacturing machine) from the three dimensional model, and manufacture the physical structure corresponding to the object with the machines using the instructions (e.g., the additive manufacturing machine using the toolpath specifications).

These and other implementations can include one or more of the following features. Determining the parting surface can include determining a connected series of points on a surface of the three dimensional topology and shape, each point of the series of points satisfying a condition defining a degree of perpendicularly between a manufacturing direction vector and a surface normal vector associated with the each point, where the series of points define a boundary of the parting surface. In some implementations, the condition requires that a dot product of the manufacturing direction vector and the surface normal vector is within a predetermined range centered on zero, or the condition requires that a dot product of the manufacturing direction vector and the surface normal vector is equal to zero. Determining the parting surface can include performing a draft analysis to locate the up skin and down skin regions of the three dimensional topology; and determining the inflection zone based on the up skin and down skin regions. The parting surface can be placed at a midpoint of the inflection zone such that the parting surface identifies an area of the three dimensional topology and shape that causes the object to be split into separate objects comprising the first object and the second object.

Obtaining the input model of the initial object can include receiving a hollow three dimensional model produced by a generative design process, the input model including the hollow three dimensional model produced by the generative design process. Obtaining the input model of the initial object can include receiving a solid three dimensional model from a generative design process; and generating a hollow version of the solid three dimensional model.

Obtaining the input model of the initial object can include obtaining, by the computer aided design program, a design space for the initial object, at least one design objective for the initial object, and at least one manufacturing constraint for the initial object, where the at least one manufacturing constraint enables flexible manufacturing of the initial object using any of two or more manufacturing techniques; and iteratively modifying, by the computer aided design program based on the design space, the at least one design objective, and the at least one manufacturing constraint, both a three dimensional topology of a generative model for the initial object and one or more outer shapes of the three dimensional topology of the generative model using a generative design process that represents the three dimensional topology of the generative model as one or more boundaries between one or more solid regions and one or more void regions within the design space. In some implementations, the modifying includes computing shape change velocities for the one or more outer shapes of the three dimensional topology of the generative model in a current iteration in accordance with the at least one manufacturing constraint, the at least one manufacturing constraint enforcing a minimum surface draft angle during the current iteration, and updating the generative model for the initial object with the generative design process using the shape change velocities.

In some implementations, the two or more manufacturing techniques include an additive manufacturing technique, a subtractive manufacturing technique, and a die cast manufacturing technique. In some implementations, the at least one manufacturing constraint enables manufacturing of the object using any of the additive manufacturing technique, the subtractive manufacturing technique, and the die cast manufacturing technique. In some implementations, the modifying includes using a constraint associated with the subtractive manufacturing technique for the generative model, and where the first physical structure, the second physical structure, or both is manufactured using the die cast manufacturing technique, an injection molding manufacturing technique, or a combination of both. In some implementations, the at least one design objective expands a transition zone between the up skin and down skin regions of the three dimensional topology of the generative model. In some implementations, the at least one design objective causes a hollow structure to form in the three dimensional topology of the generative model.

Particular embodiments of the subject matter described in this specification can be implemented to realize one or more of the following advantages. An object splitting process which can split an object into at least halves that can be manufactured using one or more low cost methods. As such, the process can decrease manufacturing costs compared to manufacturing an un-split object, which might not be otherwise manufacture-able using a low cost method. Other benefits of this process can include high mass reduction and enabling a complex design to be manufactured using a variety of manufacturing methods. The process can be automated to save time and burden on a user.

The object splitting process can be used in conjunction with a generative design process, which can provide additional advantages. A CAD program, for example, can provide a variety of different generative design synthesis methods to choose from such as: flexible manufacturing optimization that provides an output model that can be manufactured using any of a variety of techniques (as opposed to only being manufacture-able by a single manufacturing technique), a level-set-based topology optimization that provides a basic level-set method for topology optimization, a lattice and skin optimization that provides a thickness optimization of lattice and skin, and a hollow topology optimization that provides a method for topology optimization with internal hollow regions. Other and different optimizations are possible. The user can be enabled to mix and match different generative design synthesis methods, as well as a variety of input design variables, to produce generative design processes that facilitate the creation of new generative designs that meet the user's goals.

In addition, hollow structural components can be designed, which can result in a significant reduction in component mass while still meeting or exceeding specified structural loading requirements. This can result in lower material usage in manufacturing of such components, improved efficiency, ease of transportation, and reduced costs for manufacture and transport of physical structures. Generating such hollow structures can result in better strength-to-weight ratios, as compared with similar solid components, especially under bending loads. Topology optimization for a component can be performed for a part, while concurrently maintaining a hollow interior within the volume of the component. Note that, when by taking the hollow structural aspect of a component being designed into account during the topology optimization process, rather than doing solid topology optimization with a high safety factor and/or volume target so the designed component can later be manually hollowed out using standard geometry operations, mass can be reduced for a given design, while maintaining or improving structural performance, without substantial risk that the structural response changes significantly after the manual hollowing.

The details of one or more implementations are set forth in the accompanying drawings and the description below.

Other features and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
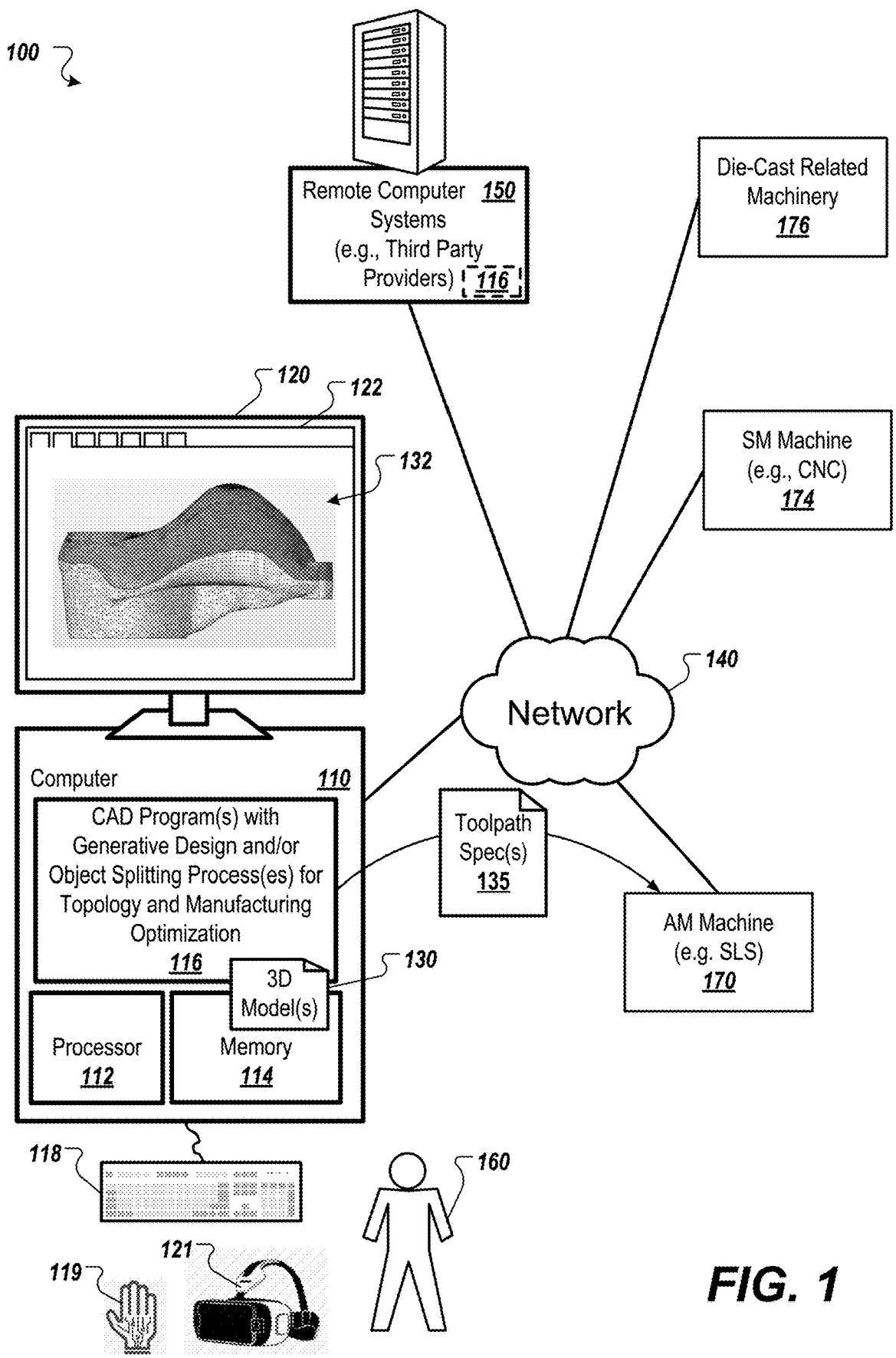
FIG. 1 shows an example of a system usable to design and manufacture physical structures.

FIG. 1 shows an example of a system 100 usable to design and manufacture physical structures. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112, including CAD program(s) 116. In some implementations, the CAD program(s) 116 can implement three-dimensional (3D) modeling functions, can include one or more generative design processes for topology optimization (e.g., using at least one level-set method as described) with physical simulation, and can include one or more object splitting processes to optimize manufacturing. The physical simulation performed by the systems and techniques described in this document can simulate one or more physical properties and can use one or more types of simulation. For example, finite element analysis (FEA), including linear static FEA, finite difference method(s), and material point method(s) can be used. Further, the simulation of physical properties can include Computational Fluid Dynamics (CFD), acoustics/noise control, thermal conduction, computational injection molding, electric or electro-magnetic flux, and/or material solidification (which is useful for phase changes in molding processes) simulations.

As used herein, CAD refers to any suitable program used to design physical structures that meet design requirements, regardless of whether or not the program is capable of interfacing with and/or controlling manufacturing equipment. Thus, CAD program(s) 116 can include Computer Aided Engineering (CAE) program(s), CAM program(s), etc. The program(s) 116 can run locally on computer 110, remotely on a computer of one or more remote computer systems 150 (e.g., one or more third party providers' one or more server systems accessible by the computer 110 via the network 140) or both locally and remotely. Thus, a CAD program 116 can be two or more programs that operate cooperatively on two or more separate computer processors in that a program 116 operating locally at computer 110 can offload processing operations (e.g., generative design and/or physical simulation operations) "to the cloud" by having one or more programs 116 on one or more computers 150 perform the offloaded processing operations.

The CAD program(s) 116 present a user interface (UI) 122 on a display device 120 of the computer 110, which can be operated using one or more input devices 118 of the computer 110 (e.g., keyboard and mouse). Note that while shown as separate devices in FIG. 1, the display device 120 and/or input devices 118 can also be integrated with each other and/or with the computer 110, such as in a tablet computer (e.g., a touch screen can be an input/output device 118, 120). Moreover, the computer 110 can include or be part of a virtual reality (VR) or augmented reality (AR) system. For example, the input/output devices 118, 120 can include a VR/AR input glove 119 and/or a VR/AR headset 121. In any case, a user 160 interacts with the CAD program(s) 116 to create and modify 3D model(s), which can be stored in 3D model document(s) 130.

The CAD program(s) 116 can generate and/or manipulate a 3D model 132. In some implementations, the 3D model 132 can be produced by a generative design process and can be subsequently provided to an object splitting process. In some implementations, the user 160 has defined a mechanical problem for a generative design process to operate on to produce a new 3D model from an initial 3D model.

In some implementations, the user 160 (or other person or program) can specify a design space for an object to be manufactured, a setup (e.g., load(s) and material(s)) for physical simulation (e.g., FEA, CFD, acoustics/noise control, thermal conduction, computational injection molding simulations, electric or electro-magnetic flux, material solidification, etc.) of the object, at least one design objective (e.g., minimize material usage) for the object, and at least one design constraint (e.g., a volume constraint) for the object. In some implementations, the inputs for use in physical simulation and generative design processes can include one or more regions of a current 3D model in which to generate new 3D geometry, loading case(s) defining one or more loads in one or more different directions to be borne by a physical structure being designed, one or more materials (e.g., one or more isotropic solid materials identified as a baseline material model for the design space), one or more seed model types to use as input to a generative design process, one or more generative design processes to use, and/or one or more lattice topologies to use in one or more regions of the design space. Inputs to the generative design and physical simulation processes can include non-design spaces, different types of components (e.g., rods, bearings, shells), one or more target manufacturing processes and associated parameters, obstacle geometries that should be avoided, preserve geometries that should be included in the final design, and parameters related to various aspects, such as resolution of the design, type of synthesis, etc.

Moreover, the CAD program(s) 116 provide user interface elements in the UI 122 to enable the user 160 to specify the various types of inputs noted above, and all (or various subsets) of these inputs can be used in the generative design and physical simulation processes described in this document. Further, the user 160 can be enabled by the UI 122 of the CAD program(s) 116 to design a part using traditional 3D modelling functions (to build precise geometric descriptions of the 3D design model) and then use generative design and simulation processes in a design space specified within one or more portions of the 3D design model. Thus, as will be appreciated, many possible types of physical structures can be designed using the systems and techniques described in this document, the UI 122 can be used to create a full mechanical problem definition for a part to be manufactured, and the generative design and physical simulation processes can accelerate new product development by enabling increased performance without time consuming physical testing.

Further, as described herein, the CAD program(s) 116 can implement at least one generative design process, which enables the CAD program(s) 116 to generate one or more portions of the 3D model(s) automatically (or the entirety of a 3D model) based on design objective(s) and constraint(s), where the geometric design is iteratively optimized based on simulation feedback. Note that, as used herein, "optimization" (or "optimum") does not mean that the best of all possible designs is achieved in all cases, but rather, that a best (or near to best) design is selected from a finite set of possible designs that can be generated, e.g., within an allotted time given the available processing resources and/or in view of competing objectives for the optimization process. The design constraints can be defined by the user 160, or by another party and imported into the CAD program(s) 116. The design constraints can include both structural integrity constraints for individual parts (e.g., a requirement that a part should not fail under the expected structural loading during use of the part) and physical constraints imposed by a larger system (e.g., a requirement that a part be contained within a specified volume so as not to interfere with other part(s) in a system during use). The design constraints can include one or more manufacturing constraints.

Various generative design processes can be used, which can optimize the shape and topology of at least a portion of the 3D model. The iterative optimization of the geometric design of the 3D model(s) by the CAD program(s) 116 involves topology optimization, which is a method of lightweighting where the optimum distribution of material is determined by minimizing an objective function subject to design constraints (e.g., structural compliance with volume as a constraint). Topology optimization can be addressed using a variety of numerical methods such as material or microstructure techniques, and geometrical or macrostructure techniques. Microstructure techniques are based on determining the optimum distribution of material density and include the Solid Isotropic Material with Penalization (SIMP) method and the homogenization method. In the SIMP method, intermediate material densities are penalized to favor either having $\rho=0$ or $\rho=1$, denoting a void or a solid, respectively. Intermediate material densities are treated as composites in the homogenization method.

In contrast, macrostructure techniques treat the material as being homogeneous, and the three dimensional topology of the modeled object being produced is represented as one or more boundaries between one or more solid regions (having the homogenous material therein) and one or more void regions (having no material therein) within the design space (also referred to as the domain or a sub-space of the domain for topology optimization). The shape(s) of the one or more boundaries are optimized during the generative design process, while the topology is changed in the domain as a result of the shape optimization in combination with adding/removing and shrinking/growing/merging the void region(s). Thus, the types of optimized topologies that can result from a generative design process using a macrostructure technique can depend significantly on the number and sizes of voids within the seed geometry for the process.

During the shape and topology optimization process, one or more voids can be introduced into the solid domain and/or one or more solids can be introduced into the void domain, so as to improve the final result of the topology and shape optimization. Thus, the CAD program(s) 116 can include various types of available seed geometries and mid-process geometry introductions, along with a user interface element allowing the user 160 to design their own seed geometries and mid-process geometry introductions. Likewise, the user 160 can run two or more generative design process iterations (saving the results from each) until a preferred generative design geometry is produced.

An object splitting process can be launched by the CAD program(s) 116 to optimize a model for manufacturing, where an object represented by the model is split into two or more objects represented by two or more 3D models. In some implementations, the object splitting process uses a model that has been previously stored. In some implementations, the object splitting process operates on a model produced by the generative design process.

Each of the two or more 3D models can be stored as a 3D model document 130, together or separately, and/or used to generate another representation of the model (e.g., a .STL file for additive manufacturing). This can be done upon request by the user 160, or in light of the user's request for another action, such as sending a 3D model to an additive manufacturing (AM) machine 170, or other manufacturing machinery, which can be directly connected to the computer 110, or connected via a network 140, as shown. This can involve a post-process carried out on the local computer 110 or a cloud service to export the 3D model to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files.

In any case, the CAD program(s) 116 can provide a document 135 (having toolpath specifications of an appropriate format) to the AM machine 170 to create a complete structure, which includes the optimized topology and shape. The AM machine 170 can employ one or more additive manufacturing techniques, such as granular techniques (e.g., Powder Bed Fusion (PBF), Selective Laser Sintering (SLS) and Direct Metal Laser Sintering (DMLS)), extrusion techniques (e.g., Fused Deposition Modelling (FDM), which can include metals deposition AM). In addition, the user 160 can save or transmit the 3D model for later use. For example, the CAD program(s) 116 can store the document 130 that includes the generated 3D model.

In some implementations, subtractive manufacturing (SM) machine(s) 174 (e.g., a Computer Numerical Control (CNC) milling machine, such as a multi-axis, multi-tool milling machine) can be used in the manufacturing process. In some implementations, such SM machine(s) 174 can be used to prepare initial work pieces on which AM machine(s) 170 will operate. In some implementations, die-cast related machinery 176 can create an initial structure on which AM machine(s) 170 will operate. In some implementations, a partially complete structure is generated by the AM machine(s) 170 and/or using casting methods (e.g., investment casting (IC) using ceramic shell or sand casting (SC) using sand cores), and this partially complete structure then has one or more portions removed (e.g., finishing) by the SM machine 174 (e.g., CNC machine) in order to form the completed structure. Moreover, in some implementations, the CAD program(s) 116 can provide a corresponding document 135 (having toolpath specifications of an appropriate format, e.g., a CNC numerical control (NC) program) to the SM machine 174 for use in manufacturing the part using various cutting tools, etc. Other techniques such as injection molding can be used.

In various implementations, the CAD program(s) 116 of the system 100 can implement one or more generative design processes as described in this document. Generative design processes seek an optimal geometric shape, topology, or both. For example, generative design processes seek an optimal geometric shape among alternative designs by minimizing a performance-related objective function subject to constraints. Mathematical programming methods used to minimize the objective function can be gradient-based or non-gradient-based.

In various implementations, the CAD program(s) 116 of the system 100 can implement one or more object splitting processes as described in this document. In some implementations, an object splitting process can split an object created by a generative design process or another process into two or more objects, e.g., multiple bodies, which are assembled after respective manufacturing to form a single, combined object. Further, the object splitting processes described herein can be used to automate generation of a component comprising multiple bodies that are assembled after manufacturing. The component can be optimized for structural loading, manufacturability, or both. The optimized component geometry can be automatically separated into multiple bodies that can then be manufactured using a range of technique such as additive manufacturing, die casting, injection molding, subtractive manufacturing, etc. These separate bodies can be assembled to form a single structure. During assembly, the separate bodies can be fastened, welded, adhesively bonded etc. The benefits of using such object splitting processes can include high mass reduction, low cost of manufacturing, and enabling complex designs to be manufactured using a large range of manufacturing methods.

The technology described herein can yield a component comprising of multiple bodies that have been assembled. In some implementations, the assembled component may be completely solid or contain a cavity or other features. The component can be complex and also manufacture-able with conventional tools. For example, a component may be designed using such tools to be manufactured in two halves and then assembled into a single component that is welded together. The halves can be manufactured using low cost methods such as die-casting but the assembled component can have greater performance (cheaper manufacturing and/or higher strength) than a single body component manufactured using die-casting.

The technology described herein can provide an automated solution of one or more processes that produce a structurally optimized geometry, identifiable inflection zone, and splitting of the final geometry into separate objects without user interaction. The separate objects of the final design can be manufactured using a variety of options, and (once manufactured and assembled together) is optimized for enhanced real world performance. For example, such automation can make achieving optimized low cost designs achievable without requiring user interaction for each step.

Figure 2:
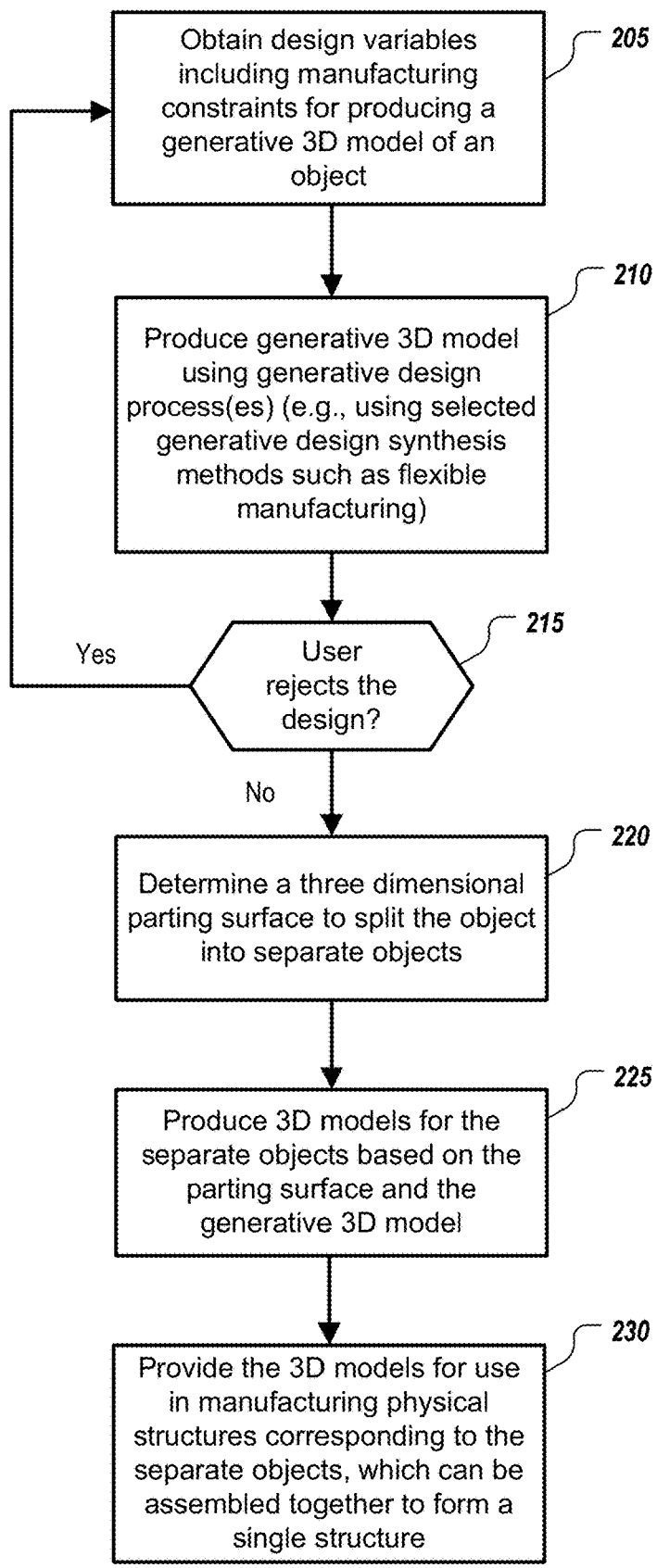
FIG. 2 shows an example of a process of designing and manufacturing physical structures.

FIG. 2 shows an example of a process of designing and manufacturing physical structures. Design variables are obtained 205, e.g., by CAD program(s) 116, for use in producing a generative 3D model of an object. The design variables can include one or more manufacturing constraints. Different generative design processes can be formulated by using different combinations of design variables, which can include lattices, density fields, and level-sets. In some implementations, the design variables can include various types of inputs, e.g., received through UI 122, such as selection among different generative design synthesis methods made available by CAD program(s) in the system 100.

The available generative design synthesis methods can include a flexible manufacturing optimization that provides an output model that can be manufactured using any of a variety of techniques (as opposed to only being manufacture-able by a single manufacturing technique). In some implementations, a flexible manufacturing constraint can cause a generative design process to produce a structurally optimized hollow design which can be split into multiple components which can be manufactured using one or more manufacturing methods, where the manufactured components can be assembled together into a single component to complete the manufacturing process.

In some implementations, the available generative design synthesis methods also include (1) a level-set-based topology optimization that provides a basic level-set method for topology optimization, (2) a lattice and skin optimization that provides a thickness optimization of lattice and skin, (3) a hybrid topology optimization that provides a topology optimization with lattice infill, (4) an inside-out hybrid topology optimization in which the lattice infill is present in a negative space between the topology-optimized design and the original design space, (5) a hollow topology optimization that provides a method for topology optimization with internal hollow regions, and/or (6) a hybrid-hollow topology optimization that provides a method for topology optimization with lattice infill and internal hollow regions.

Additional, design variables are possible, such as (1) a design space for generative design geometry production, e.g., a boundary representation (B-Rep) 3D model designed or loaded into CAD program(s) 116 that serves as a sub-space of an optimization domain of a described generative design process, and/or (2) a set of input solids that specify boundary conditions for generative design geometry production, e.g., B-Reps selected using UI 122 to specify sub-space(s) that are preserved for use as connection point(s) with other component(s) in a larger 3D model or separate 3D model(s). Different combinations of design variables can be used, e.g., by CAD program(s) 116 in response to input from the user 160. For example, a user 160 may select different generative design synthesis methods to use within respective different design spaces within a single 3D model.

Other design variables can include a setup for physical simulation, e.g., densities of elements in an FEA model or a homogenized lattice material representation for a selected lattice topology to be used with an optimized 3D topology of the part being generatively designed. The design variables can include various design objectives and constraints, such as described in this document. Furthermore, functions can be provided, e.g., by CAD program(s) 116, that assist the user in specifying design variables. For example, a lattice recommender can provide predictions for suitable lattice settings for a given problem using a single solid simulation.

With the generative design variables specified, one or more 3D model(s) are produced 210, e.g., by CAD program(s) 116, using one or more generative design processes (e.g., using one or more selected generative design synthesis methods). In some implementations, the one or more generative design processes can use one or more level-set methods, where a boundary of a solid region can be implicitly represented using one or more level-sets, which are signed distance values computed on a Cartesian background grid. In some implementations, modified versions of the signed distance values can be used to enable flexible manufacturing. In some implementations, the generative design process can use a voxel-based solver. In some implementations, the generative design process can use tetrahedral elements, conventional body-fitted solvers, or both. In some implementations, the generative design process can use cut-elements to interpolate element density. In some implementations, the generative design process uses backup-and-recovery, load case specific advection to prevent disconnected geometry. In some implementations, the generative design process can employ one or more proportional-integral-derivative (PID) controllers and related technologies such as adaptive PID tuning or PID auto-tuning to meet arbitrary design constraints. In some implementations, the generative design process can use an augmented Lagrangian method (ALM).

In some implementations, in a level-set-based topology optimization method, the outer shape of a structure is represented by a one-dimensional high-level level set function, and a change in shape and configuration is replaced by a change in the level set function value, so as to obtain an optimum structure. The level set function refers to a function that indicates whether each part of the design domain where the initial structure is set corresponds to a material domain (material phase) that forms the structure and is occupied by a material, a void domain (void phase) where a void is formed, or a boundary between these two domains, wherein a predetermined value between a value representing the material domain and a value representing the void domain represents the boundary between the material domain and the void domain. In some implementations, the output 3D model of the generative design process can be a single hollow component for an additive manufacturing process, and this hollow component is then split into separate components for traditional manufacturing.

The CAD program(s) 116 can provide, among other things, user control over the generative design process, as well as post-processing of the generative design output to form a final, acceptable 3D model of an object, and control functions for providing the generatively designed 3D model for use in manufacturing a physical structure corresponding to the object. Thus, the results of a generative design process can be presented to the user, e.g., in UI 122 on display device 120, along with an option 215 to accept or reject the design. If the design is rejected, the process of FIG. 2 can return to obtain 205, e.g., by CAD program(s) 116, new design variables for use in producing a new generative 3D model.

If a design is not rejected 215, the process of FIG. 2 can determine 220 a three dimensional parting surface to split the object into separate objects. In some implementations, the parting surface intersects an inflection zone that is situated between up skin and down skin regions of the three dimensional topology and shape produced by the generative design process. In some implementations, a connected series of points on a surface of the three dimensional topology and shape is determined where the series of points define a boundary of the parting surface. Each point of the series of points can satisfy a condition defining a degree of perpendicularly between a manufacturing direction vector and a surface normal vector associated with each point.

The process of FIG. 2 can produce 225 3D models for the separate objects based on the parting surface and the generative 3D model. In some implementations, the determining 220 and producing 225 can be included as part of producing 210 the generative 3D model or a step before the option 215 to accept or reject the design. In some implementations, determining the 3D parting surface includes using the process of FIG. 6 or another splitting process described herein.

The process of FIG. 2 can provide 230, e.g., by CAD program(s) 116, the 3D models for use in manufacturing physical structures corresponding to the separate objects using one or more computer-controlled manufacturing systems, e.g., AM machine 170, SM machine 174, die-case related machinery 176, and/or other manufacturing machines. The providing 230 can involve sending or saving the 3D models to a permanent storage device for use in manufacturing the physical structures corresponding to the separate objects using the one or more computer-controlled manufacturing systems. In some implementations, the providing 230 involves generating toolpath specifications for the computer-controlled manufacturing system(s) using the 3D models for the separate objects, and manufacturing the physical structures corresponding to the separate objects with the computer-controlled manufacturing system(s) using the toolpath specifications. After manufacturing, the physical structures corresponding to the separate objects can be assembled together to form a single structure.

While described in the context of a CAD program providing multiple design options, each of the generative design processes and object splitting processes described in this document can be implemented as a standalone process in a CAD program. Thus, not all of the generative design processes and object splitting processes described herein need be implemented together in any given implementation.

Figure 3A:
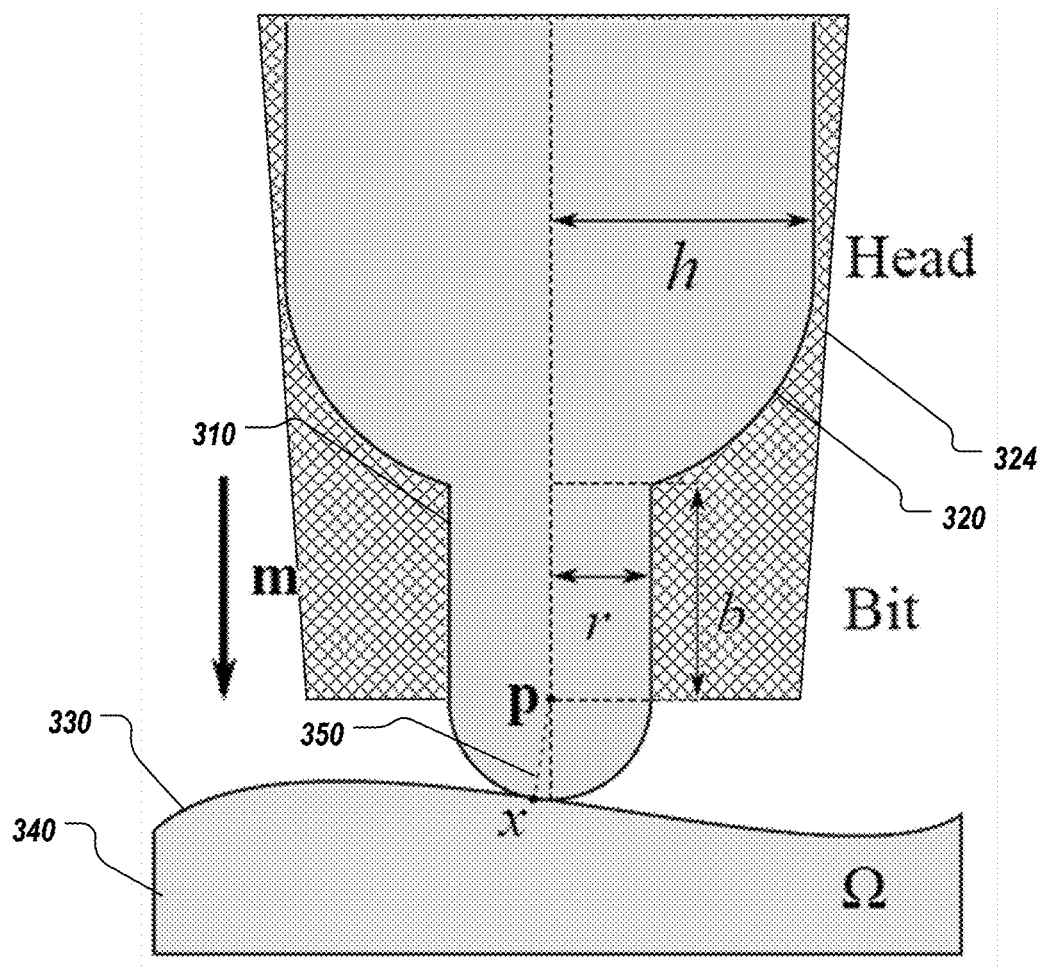
FIG. 3A shows a diagram of an example of a milling geometry associated with a tool and an object.

FIG. 3A shows a diagram of an example of a milling geometry associated with a tool. In this example, a tool bit 310 is attached to a tool head 320. The tool bit 310 is defined by a set of dimensions including a tool bit radius r and a tool bit length b. As shown, the tool bit 310 includes a cylinder (having a radius r and a length b) which is capped by a hemisphere oriented in a machining direction m towards the object 340. Note that there can be different machining directions and $m_i$ can be used to reference a particular machining direction. The tool head 320 is defined by a set of dimensions including a tool head radius h. The tip of the tool bit 310 makes contact with a surface boundary 330 of the object 340 (represented as domain Ω) at point x. Further, a surface normal 350 at point x is shown. Based on a constraint such as a 3 axis CNC milling constraint, the milling geometry can be adjusted to enforce a minimum surface draft angle during shape optimization. For example, the boundary of the tool (including the tool bit 310 and the tool head 320) can be broadened, e.g., expanded to the boundaries of a trapezoid 324 to promote acceptable draft angles for manufacturing, which can promote flexible manufacturing. In some implementations, the draft angle enforcement can be achieved by modifying a ray tracing technique that is used to detect intersections between the tool geometry and the part being optimized. The ray cast from the center of the capped hemisphere outward along $-m_i$ can be used to detect intersections with the offset part surface. A CAD program can increase the offset amount as a function of the draft angle as the distance along the ray increases to account for the draft in the tool. This has the desired effect of a drafted tool shape for the milling constraint and produces a part geometry that has the appropriate draft angles. Further, sharpening and/or shrinking the thickness of the parting zone to a line or curve can have splitting and downstream manufacturing benefits. With a tighter parting zone, the zone itself can become more defined, which can help to improve finding where to split the part. At the manufacturing stage, such as die-casting for example, the built in draft angle can ensure a smaller amount of surface which will be parallel to the mold tool draw direction which aids in the removal of the part from the mold.

As a machining direction m and a surface normal n(x) at point x are each unit vectors (a vector whose norm equals one), when these unit vectors are parallel to each other the absolute dot product value equals 1 and when these unit vectors are perpendicular to each other the absolute dot product value equals 0. Thus, the closer a particular accessible direction is to the surface normal, the greater the scalar function value for the particular accessible direction. In general, a first accessible direction having a higher associated scalar function value is considered a "better" machining direction that a second accessible direction having a lower associated scalar function value, since the first accessible direction is closer to the surface normal at point x than the second accessible direction. Thus, when there are two or more accessible directions for point x, the "best" accessible direction having the highest scalar function value is selected for point x, whereby the scalar function value for point x is then set to equal this highest scalar function value.

As used in various algorithms described herein, $V_{bit}(x)$ may represent a volume space occupied by the tool bit when oriented along the machining direction $m_i$ and the tip of the tool bit is located and contacting point x on the boundary of the object. $V_{head}(x)$ may represent a volume space occupied by the tool head when oriented along the machining direction $m_i$ and the tip of the tool bit is located and contacting point x on the boundary of the object. Thus, $V_i(x)$ may represent a volume space occupied by a union of the tool bit and the tool head when oriented along the machining direction $m_i$ and the tip of the tool bit is located and contacting point x on the boundary of the object.

The CAD program can use various algorithms such as those described herein to determine whether a particular point x on the boundary of the object is accessible by a particular machining direction $m_i$. Some of the various algorithms can implement a ray casting technique to determine the accessibility or inaccessibility of a particular point x by a particular machining direction $m_i$. In these implementations, the CAD program can perform a first ray casting operation for the tool bit and a second ray casting operation for the tool head to determine whether point x is accessible by a particular machining direction $m_i$.

Figure 3B:
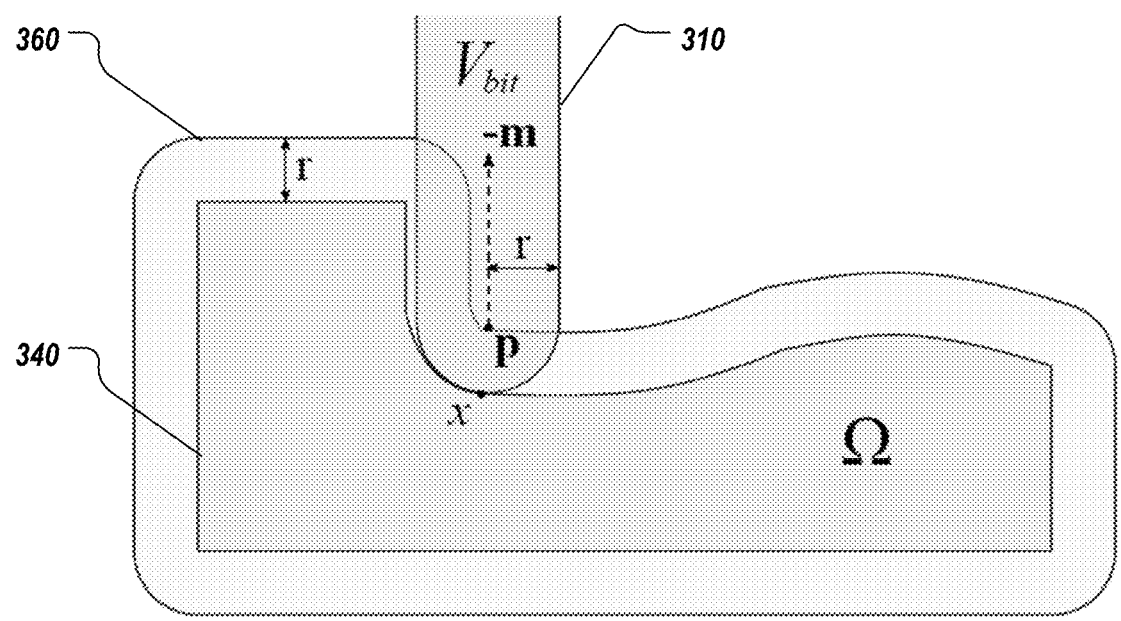
FIG. 3B shows an example of a ray casting technique to determine the accessibility or inaccessibility of a particular point on the boundary of the object shown in FIG. 3A.

FIG. 3B shows an example of a ray casting technique to determine the accessibility or inaccessibility of a particular point on the boundary of the object 340 shown in FIG. 3A. As described above, the boundary of the tool (including the tool bit 310 and the tool head 320) can be broadened to fit the dimensions of a trapezoid 324 as shown in FIG. 3A to promote flexible manufacturing. As such, if flexible manufacturing is selected as a design objective, the boundaries of the tool bit 310 and tool head 320 can be replaced by the boundaries of the trapezoid 324 as shown in FIG. 3A, which can increase tool volumes.

A first ray casting operation can apply to determining whether the tool bit 310 can access a particular point x on the boundary of the object 340 using a particular machining direction m without any other portion of the tool bit making contact with any other portion of the object. As shown, when oriented in a particular machining direction m, when the tip of the tool bit 310 (having radius r and defined by volume $V_{bit}$) makes contact with the surface boundary of a 3D model of the object 340 (represented by object domain Ω) at point x, no other portion of the tool bit 310 makes contact with any other portion of the 3D model of the object 340. The accessibility of point x using the particular machining direction can be determined by casting a ray in direction −m that originates at point p. A 3D model of the object offset by tool bit radius r is generated and represented as offset domain $Ω^+$ 360. Thus, the boundary of the 3D model of the object is offset by tool bit radius r to produce an "offset boundary" of the 3D model of the object. Point p is offset from point x by radius r in the direction of the surface normal at point x. Thus, the location of point p (corresponding to point x on the boundary of domain Ω) is at the intersection of the boundary of offset domain $Ω^+$ and the surface normal at point x (i.e., p=x+n(x)*r). In some implementations, if the casting ray originating at p in direction −m intersects the boundary of offset domain $Ω^+$ (Ω offset by r) at an intersection point, it is then determined that the tool bit 310 contacts the 3D model of the object 340 (i.e., $V_{bit} \cap Ω \neq \emptyset$). If the casting ray does not intersect the boundary of offset domain $Ω^+$, as shown in FIG. 3B, it is then determined that the tool bit 310 does not contact the 3D model of the object 340 (i.e., $V_{bit} \cap Ω = \emptyset$).

A second ray casting operation can be performed to determine whether a tool head can access a particular point x on the boundary of the object using a particular machining direction m without any other portion of the tool head making contact with any other portion of the object. However, in the second ray casting operation, the offset domain $Ω^+$ comprises Ω offset by tool head radius h. Also, the casting ray in direction −m originates at point p′ which corresponds to point x on the boundary of domain Ω, wherein p′=p−m (b+h). Here, b equals the tool bit length and h equals the tool head radius. In some embodiments, if the casting ray originating at p′ in direction −m intersects the offset domain $Ω^+$ (Ω offset by h) at an intersection point t, it is then determined that the tool head 320 contacts/intersects the 3D model of the object 340 (i.e., $V_{head} \cap Ω \neq \emptyset$). If the casting ray does not intersect the offset domain $Ω^+$, it is then determined that the tool head 320 does not contact/intersect the 3D model of the object 340 (i.e., $V_{head} \cap Ω \neq \emptyset$).

The CAD program can then combine the results of the first and second ray casting operations to determine whether point x is accessible by a particular machining direction $m_i$. In particular, it is determined that point x is accessible by machining direction $m_i$ if it is determined that the tool bit 310 does not contact the 3D model of the object 340 aside from point x (i.e., $V_{bit} \cap Ω \neq \emptyset$) and it is determined that the tool head 320 does not contact the 3D model of the object 340 (i.e., $V_{head} \cap Ω \neq \emptyset$). In other words, it is determined that point x is accessible by machining direction $m_i$ (i.e., $V_i \cap Ω \neq \emptyset$) if $V_{bit} \cap Ω = \emptyset$ and $V_{head} \cap Ω = \emptyset$. Otherwise, point x is determined not to be accessible by machining direction $m_i$. In other words, it is determined that point x is not accessible by machining direction $m_i$ if it is determined that either the tool bit 310 contacts the 3D model of the object 340 (i.e., $V_{bit} \cap Ω \neq \emptyset$) or it is determined that the tool head 320 contacts the 3D model of the object 340 (i.e., $V_{head} \cap Ω \neq \emptyset$). Thus, it is determined that point x is not accessible by machining direction $m_i$ (i.e., $V_i \cap Ω \neq \emptyset$) if either $V_{head} \cap Ω \neq \emptyset$ or $V_{head} \cap Ω \neq \emptyset$.

A CAD program can use various algorithms described herein to perform topology optimization to achieve the design objectives while enforcing the manufacturing constraints and achieving accessibility. In some implementations, the CAD program can perform level set-based topology optimization by implementing one or more algorithms described herein. In some implementations, a CAD software library can implement Algorithms 1-4. Other algorithms discussed herein may call one or more of Algorithms 1-4 to perform one or more specific functions. The functions performed by the level set Algorithms 1-4 are expressed by the pseudocode provided in Tables 1-4. Additional details about these and other algorithms are provided in U.S. Patent Publication No. 2018/0349531, filed Jun. 1, 2008 and entitled "TOPOLOGY OPTIMIZATION FOR SUBTRACTIVE MANUFACTURING TECHNIQUES" (hereinafter, the '531 Publication), which is hereby incorporated by reference in its entirety. However, other and/or different algorithms can be used.

TABLE 1

Algorithm 1: LevelSetRayCast

Input: Level set, rayStart, rayDirection, levelSetValue, hitPoint
Result: Returns true if the ray crosses the level set at levelSetValue and stores the intersection point in hitPoint

TABLE 2

Algorithm 2: LevelSetOffset

Input: Level set $\Omega$, offset value o
Result: Applies an offset of o to the signed distance function for $\Omega$ such that the zero-levelset is uniformly advanced outwardly in the direction of on, where n is the surface normal. If the level set is narrow band then the narrow band must be updated such that it centers on the new zero-level set.

TABLE 3

Algorithm 3: LevelSetAdvection

Input: Level set $\Omega$, scalar field v, time t
Result: Solves the Hamilton-Jacobi equation on the signed distance function with the speed defined by the scalar field v over a duration t.

TABLE 4

Algorithm 4: LevelSetClose

Input: Level set $\Omega$, close value o
Result: Morphological operation that performs an offset by o followed by an inset or negative offset of o. The result is a removal of holes of radius o.

As shown, Algorithm 1 receives as input a level set, rayStart, rayDirection, levelSetValue, and hitPoint and returns true if the ray crosses the level set at levelSetValue and stores the intersection point in hitPoint. Algorithm 1 executes a "LevelSetRayCast" function that casts a ray originating from starting point (rayStart) in a direction (rayDirection) which, if the ray intersects the surface of the 3D model of the object, returns the location of the intersection location at hitPoint. Algorithm 1 may be used to test for an intersection between the tool bit and the object and for intersection between the 3D model of the tool head and the 3D model of the object the holder.

As shown, Algorithm 2 receives as input level set $\Omega$ and offset value o and applies an offset of o to the signed distance function for $\Omega$ such that the zero-level set is uniformly advanced outwardly in the direction of on, where n is the surface normal. Algorithm 2 executes a "LevelSetOffset" function that expands (or contracts) the boundary of the 3D model of the object by a uniform amount.

As shown, Algorithm 3 receives as input level set $\Omega$, scalar field v, and time t and solves the Hamilton-Jacobi equation on the signed distance function with the speed function defined by the scalar field v over a duration t. Algorithm 3 executes a "LevelSetAdvection" function that moves the boundary of the 3D model of the object in the normal direction by an amount determined by a speed function.

As shown, Algorithm 4 receives as input level set $\Omega$ and close value o and performs a morphological operation that performs an offset by o followed by an inset or negative offset of o. The result is a removal of holes of radius o. Algorithm 4 executes a "LevelSetClose" function that uses Algorithm 2 to offset the boundary of the 3D model of the object and then inset the boundary of the 3D model of the object resulting in removal of small holes and sharp concave corners in the boundary of the 3D model of the object.

One or more algorithms, such as Algorithms 1-4, can be revised based on a modified tool geometry that enables flexible manufacturing, see, e.g., trapezoid 324 in FIG. 3A. For example, Algorithm 1, which is the LevelSetRayCast Algorithm, can be revised to take an additional parameter based on a sample offset function $f=f(p,t)=Sample(p)-t*\sin(\theta)$, where $\theta$ represents a draft angle, and t represents a distance. The Sample(p) function returns the value of a signed distance field at point p. In more detail, the revised LevelSetRayCast Algorithm can simulate a draft angle by replacing a standard sampling of the signed distance field along the ray with an offset version defined by the sample offset function $f(p,t)$.

As shown in Table 5, Algorithm 5 receives as input level set $\Omega$, n, set of milling directions M, algorithm mode, and max search iterations (maxIters) and determines the scalar function value $\eta(x)$. Algorithm 5 executes a "Milling Constraint" operation that iterates through each point x on the boundary of the 3D model of the object. For each point x, Algorithm 5 iterates through each machining/milling direction $m_i$ in the set of machining/milling directions M to test for accessibility of a current point x by calling Algorithm 6 "MillingTest." Algorithm 5 calls on "SearchDirections" to determine which machining/milling directions are to be added to the set of milling directions M for testing by Algorithm 6 "MillingTest" in a subsequent interaction. An example of the SearchDirections Algorithm is disclosed as Algorithm 9 in the '531 Publication, which can call Algorithm 7 "NormalSearch" or Algorithm 8 "HeatSearch" depending on what type of search is preferred. In some implementations, a call to "SearchDirections" is not required if the set of milling directions M is already determined for a manufacturing machine, e.g., 3-axis manufacturing machine.

TABLE 5

Algorithm 5: Milling Constraint

Input: Level set of $\Omega$, n, set of milling directions M, algorithm mode, max search iterations maxIters
Result: Evaluation of $\eta$
Extend narrow-band of $\Omega$ up to h;

TABLE 5-continued

Algorithm 5: Milling Constraint

```
for x on boundary of Ω do
|       p = x + n · r;
|       iter = 0;
|       q = p;
|       for m, in M do
|       |       accessible = MillingTest(Ω,n(x),p,m_i,η(x));
|       |       if iter < maxIters then
|       |       |       SearehDirections(Ω,n,M,algorithm mode,
|       |       |           accessible);
|       |       |       iter = iter + 1;
|       |       end
|       end
end
```

As shown in Table 6, Algorithm 6 performs a level set evaluation for $V_i(x) \cap \Omega$. Algorithm 6 receives as input level set $\Omega$, n(x), p, and η(x) and returns accessibility enumeration, such that if point x is accessible using current milling direction $m_i$, then updates the value for η(x) for the current $m_i$, and otherwise returns the intersection point t. The value for "hit" may comprise a Boolean output value from Algorithm 1 "LevelSetRayCast" which is equal to true when the ray cast intersects a boundary of the 3D model of the object and false when it detects no intersection with the boundary of the 3D model of the object. Based on the call from the Algorithm 6, Algorithm 1 "LevelSetRayCast" moves from the center of the tip of the tool a distance t in the negative milling direction to obtain point p. Instead of directly calling Sample(p), the sample offset function f(p,t) is called which returns an offset version of Sample(p), where the offset takes into account the draft angle θ and the distance t along the ray. Thus, Algorithm 6 determines the scalar function value η(x) for a current machining direction $m_i$ for a current point x. Algorithm 6 may determine if the current point x is accessible by the current machining direction $m_i$ by combining the results of the first and second ray casting operations for the tool bit and the tool head, as discussed in relation to FIG. 3B. If the current point x is found accessible by the current machining direction Algorithm 6 then returns the scalar function value η(x) for the current machining direction otherwise Algorithm 6 returns the intersection point t.

TABLE 6

Algorithm 6: MillingTest: Level set evaluation for $V_i(x) \cap \Omega$

```
Input: Level set Ω, n(x), p, m_i, η(x), f = f(p,t) =
    Sample(p) – t*sin(θ)
Result: Returns accessibility enum. If m_i is accessible, it
    updates η(x) for this m_i
    otherwise returns intersection point t
// Tool bit test
if n(x) · m_i < 0 then
|               hit = LevelSetRayCast(Ω,p,–m_i,r,t,f);
|               if !hit then
|               |       // Head test
|               |       hit = LevelSetRayCast(Ω,p –
|               |           m_i(b + h),–m_i,h,t,f);
|               |       if !hit then
|               |       |               η(x) = max
|               |       |                   (η(x), –m_i · n(x));
|               |       |               return Accessible;
|               |       end
|               else
|               |       return HeadNotAccessible;
|               end
end
return BitNotAccessible;
```

The CAD program can execute a level set topology optimization algorithm such as Algorithm 10 in Table 7 in some implementations. Algorithm 10 is a strict algorithm that prevents growth (i.e., a positive speed function) at each point x on the boundary of the 3D model of the object. In some implementations, the CAD program executes a relaxed algorithm that allows growth at various points x on the boundary of the 3D model of the object. An example of a relaxed algorithm is Algorithm 11 as disclosed in the '531 Publication. The operations performed by Algorithm 10 are expressed by the following pseudocode.

TABLE 7

Algorithm 10: Level Set Topology Optimization
with CNC Constraint Strict Algorithm

```
Input: Initial part domain Ω, Boundary conditions, Objective
    function, Milling parameters r,b and h, set of milling directions M
Result: Optimized version of Ω
for each iter do
|               EvaluateSensitivities(Ω,Boundary
|                   conditions,Objective function);
|               v = ComputeShapeDerivative( );
|               η = MillingConstraint(Ω,n,M,maxIters);
|               for x on boundary of Ω do
|               |       if v(x) > 0 then
|               |       |               η(x) = 0
|               |       end
|               end
|               LevelSetAdvection(Ω,ηv);
|               if Objective function converged then
|               |       break;
|               end
end
LevelSetClose(Ω,r);
```

When implementing Algorithm 10, at each iteration of the topology optimization, each point x on the boundary may only remain at the same position (i.e., the speed function equals 0) or move inward in the opposite direction of the surface normal (i.e., a negative speed function) so that the manufacturing constraints are never violated during any iteration of the topology optimization. At each iteration, the physical qualities (such as Von Mises stress or Strain energy or Volume) are evaluated using necessary solver(s) (e.g. FEA solver) which are then used to compute the speed function based on the shape derivatives of the design objectives. The shape derivatives of the design objectives may indicate how to locally modify the boundary of the object to improve/converge on the design objectives. The milling constraint η is obtained by calling Algorithm 5. The η(x) values for a point on a boundary of Ω can be set to zero if the speed function is greater than zero for that point, e.g., it is removed because it could allow for boundary growth. The boundary shape Ω is then updated by a level set advection with ηv as the speed function value. Use of Algorithm 10 ensures that accessible material of the object is removed at each iteration and requires that the initial shape of Ω (the initial 3D model of the object) includes a feasible start that is fully accessible. When the topology optimization has converged to a locally optimal 3D model of the object (given the initial 3D model of the object), the topology optimization may be stopped. Convergence on the local optimum can be tested when either the boundary gradient approaches zero (indicating that locally modifying the boundary will not improve performance with respect to the design objectives) or the changes in the boundary between the last iteration and the current iteration are below a threshold. The final step of Algorithm 10 performs the morphological closing of Ω, which adds fillets and fills any cavities smaller than the tool bit radius r that have been created.

Figure 4:
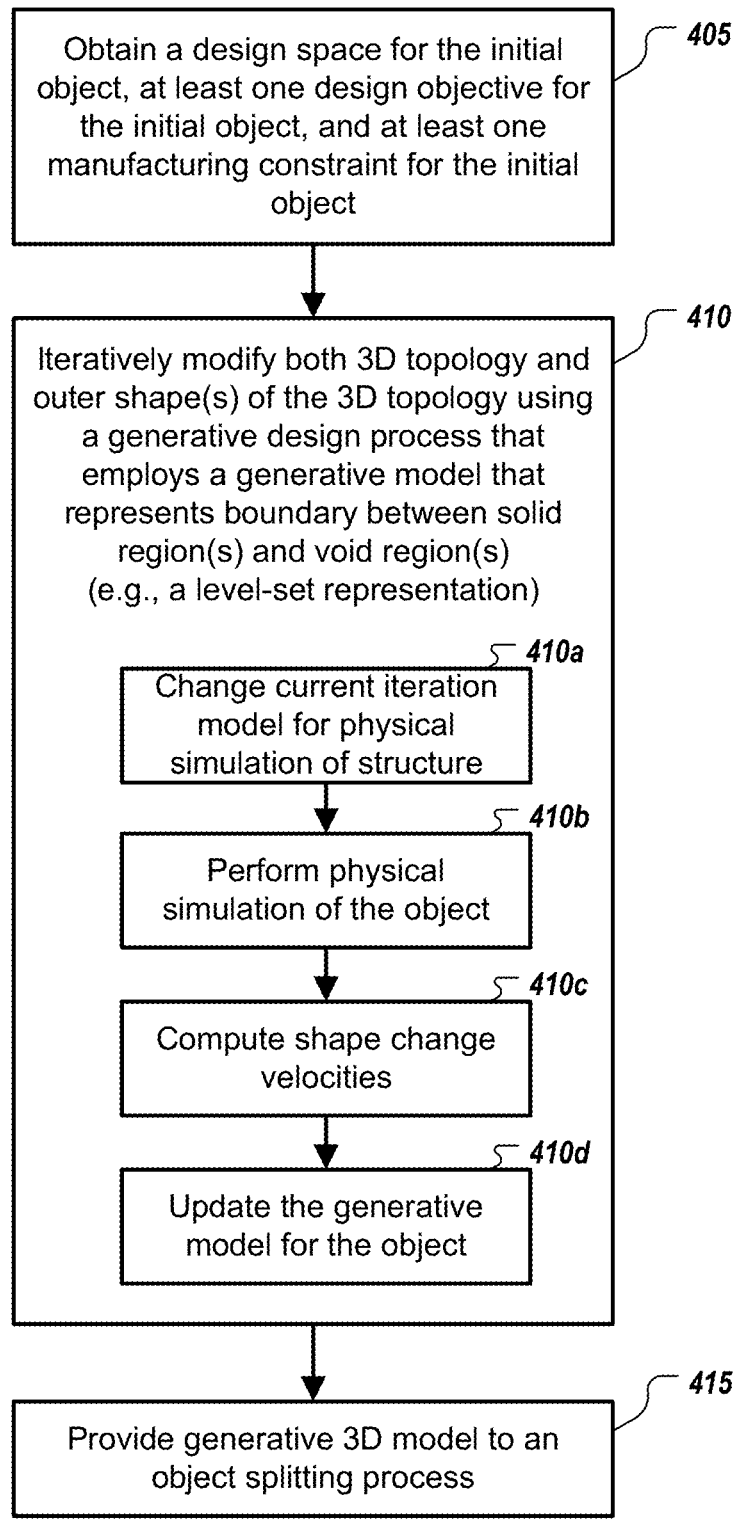
FIG. 4 shows an example of a process that optimizes a topology of a 3D model of an object being generatively designed for manufacture.

FIG. 4 shows an example of a process (e.g., as performed by the CAD program(s) 116 of FIG. 1) that optimizes a topology of a 3D model of an object being generatively designed for manufacture. Design criteria, boundary conditions, design constraints such as one or more manufacturing constraints, and/or other design variables are obtained 405, e.g., by the CAD program(s) 116. This can involve receiving user input, e.g., via UI 122 on display device 120, importing information from another program or a third party source, and/or one or more of these inputs can be predefined in a given implementation.

The boundary conditions can be a mechanical problem definition and input solid(s) that are preserved for use as connection point(s) with other component(s) in a larger 3D model or separate 3D model(s). In some implementations, the obtaining 405 includes receiving input, e.g., via UI 122 on display device 120, indicating an initial 3D model defining at least a portion of the design space for topology optimization of the object. In some implementations, the user is enabled, e.g., via UI 122 on display device 120, to select multiple parts from an assembly shown in the UI, and the user is enabled to indicate loading points and keep away regions for the design. The software, e.g., CAD program(s) 116, can then use the inverse of these as the design space. Other inputs can also be obtained 405, such as a hollow structure offset value input (e.g., a constant offset selected by a user of the CAD program(s) 116 used to define the hollow structure during topology optimization).

The design criteria can include one or more design objectives and one or more design constraints. Design objectives can include those that minimize one or more cost functions and/or that maximize one or more utility functions for the object to be manufactured. In some implementations, design objectives include one or more of the following: (1) minimizing material usage (e.g., waste material), (2) minimizing weight, (3) minimizing manufacturing time, (4) maximizing tool life, (5) maximizing ability to remove support material, (6) targeting a set natural frequency (e.g., higher/lower natural modes of vibration to achieve vibration damping), and (7) positioning and packing of parts within the structure (e.g., electronic components for circuit actuation, including reserving space for cabling between components in an assembly, limiting cabling length, and/or components for structural health monitoring, as well as assembly considerations to ensure each component can be added/removed independently or with a limited number of steps). In some implementations, a design objective can expand a transition zone between the up skin and down skin regions of an object's three dimensional topology. This design objective can minimize or eliminate a razor-like transition zone and promote a flatter and/or smoother transition zone to develop during the generative design process.

Design constraints can include those that address manufacturing requirements, use requirements, or both. In some implementations, a flexible manufacturing constraint can be selected as a design constraint such that the object can be made using any of a variety of techniques such as subtractive manufacturing, additive manufacturing, and/or die cast manufacturing. Other manufacturing techniques are possible. For example, a constraint for subtractive manufacturing (e.g., a user defined milling tool to be used in CNC milling as modified by trapezoid 324 in FIG. 3A) can be used to generatively design a part, which can be split into pieces by using an object splitting process described herein such that one or more of the pieces can be manufactured using a different, potentially cheaper technique such as die casting or injection molding.

In some implementations, potential design constraints also include one or more of the following: (1) manufacturing constraints that restrict geometries to those that can be manufactured (e.g., minimum self-supporting angle for AM processes in which separate support material will not be used, subject to build direction when appropriate, or mechanical access constraints for AM or SM processes, such as 3-axis, 5-axis and/or 2.5-axis CNC constraints), (2) thermo-mechanical constraints, (3) material fraction or variation constraints, (4) structural integrity, (5) stiffness, (6) compliance, (7) stress criteria (e.g., Von Mises or Tsai-Wu stress for manufacturing or use), (8) physical constraints (non-interference with larger system of parts), and (9) damage constraints (e.g., brittle elastic fraction resistance). In some implementations, the design criteria include minimizing compliance with volume, stress, displacement, buckling safety factor, and/or natural frequency constraints, but the method(s) can be generalized to other design objectives and constraints, including minimizing volume, deviation (e.g., least square deviation) from a target (compliant mechanism), and/or design dependent loads (pressure loads).

In some implementations, a design space for an object to be manufactured, a setup for physical simulation of the object, at least one design objective for the object, and at least one design constraint for the object are obtained 405, e.g., by the CAD program(s) 116 of FIG. 1. The physical simulation performed by one or more of the systems and techniques described in this document can simulate one or more physical properties and can use one or more types of simulation. For example, FEA, including linear static FEA, finite difference method(s), and material point method(s) can be used. Further, the simulation of physical properties can include, among other possibilities, simulating buckling, natural frequency, thermal, electric or electro-magnetic flux, and material solidification properties. Note that the setup for physical simulation(s) will be different for different physical simulation(s).

Both a three dimensional topology of a generative model for the object and one or more outer shapes of the three dimensional topology are iteratively modified 410, e.g., by the CAD program(s) 116, using a generative design process that represents the three dimensional topology of the generative model as one or more boundaries between one or more solid regions and one or more void regions within the design space. In some implementations, this can include using gradient based algorithms to optimize the 3D topology and shape of the object model, or other algorithms, such as evolutionary algorithms and stochastic algorithms. Further, the generative model can be a level-set representation of the one or more outer shapes of the three dimensional topology, and a level-set method of topology optimization can be employed. In some implementations, this can include using one or more algorithms described herein such as Algorithms 1-10.

A current iteration of the model being iteratively modified is changed 410a for physical simulation. This can involve changing 410a a constitutive model for the physical simulation in accordance with a current iteration of the three dimensional topology. In some implementations, one or more outer shapes of the three dimensional topology can be offset inward to define a hollow structure in the three dimensional topology. For example, a Boolean difference operation can be performed 410a. In some implementations, the offset inward to define the hollow structure is a constant offset selected by a user of the computer aided design program, as noted above, thus setting the initial thickness of the hollow structure. In some implementations, the initial thickness is retrieved from a database of known good values for a given manufacturing process.

Physical simulation of the object is performed 410b using the changed constitutive model to produce a physical assessment with respect to the at least one design objective and the at least one design constraint. As noted above, various types of physical simulations can be used, and thus various types of physical assessments can be produced. In some implementations, performing 410b the physical simulation involves performing finite element analysis simulation using a body-fitted mesh based solver, and the constitutive model is changed 410a by mapping geometric field data and finite element simulation data between voxel grid points of a level-set representation of the generative model and elements of a solid mesh model used by the finite element analysis simulation. In some implementations, a solid mesh based simulation can be non-body fitted, e.g., solved using voxel solvers.

Shape change velocities are computed 410c for the one or more outer shapes of the three dimensional topology in the current iteration. In some implementations, computing 410c the shape change velocities involves using an ALM to compute advection velocities, such as when multiple shape derivatives are present. The shape change velocities can be computed 410c in accordance with the physical assessment and constraints such as one or more manufacturing constraints. For example, this can involve computing 410c shape derivative and advection velocity in accordance with the relevant functions in Algorithm 10. At each iteration in Algorithm 10, the physical sensitivities can be evaluated using the necessary solver(s) (e.g. FEA solver), then these are used to compute the speed function v based on the shape derivatives of the objective function. The milling constraint function η can be determined by Algorithm 5 for example. Positive speeds that could allow for shape growth can be removed.

Then, the generative model for the object is updated 410d using the shape change velocities before the next iteration. For example, the updating 410d can use the advection velocities from the ALM. In some implementations, a level-set method is used. For example, the shape Ω can be updated by level set advection with ηv as the speed function as provided in Algorithm 10. This algorithm ensures that only accessible material is removed at each iteration and it requires that the initial shape of Ω be fully accessible (a feasible start). In some implementations, non-level-set surface manipulation, such as T-spline, or B-Rep control point movement or nodal movement in meshes, can be used. After updating 410d, a convergence criteria (e.g., less than a maximum number of iterations, etc.) can be checked to determine whether to perform steps 401a-d again. The output model of the generative design process can be provided 415 to an object splitting process.

Figure 5A:
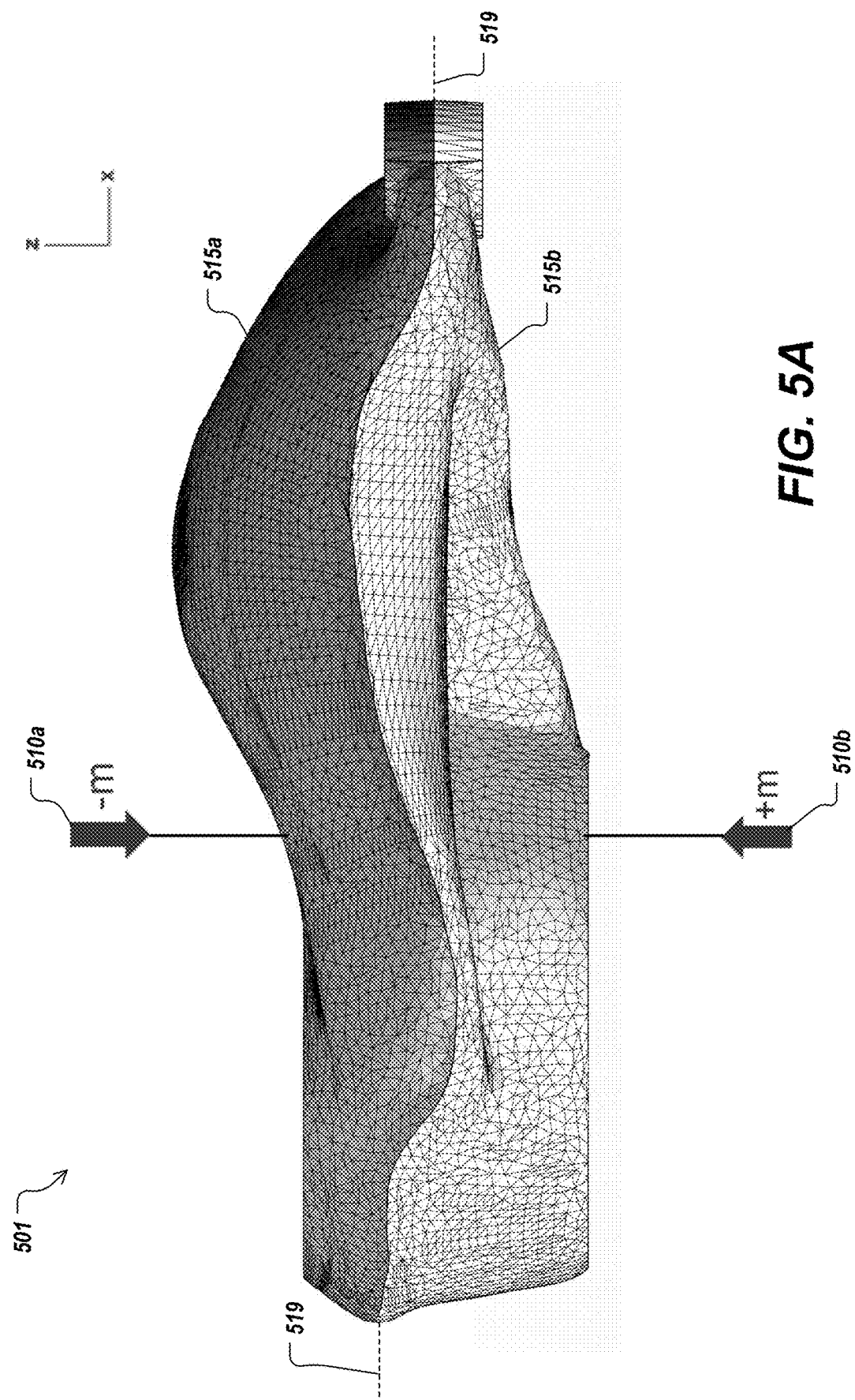
FIGS. 5A-5D show different views of an example of a 3D topology of an object with a parting zone and parting surface.

FIG. 5A shows a side view of an example of a 3D topology of an object 501 with a parting zone 519. A wire mesh overlays the 3D topology of the object 501. The 3D topology can be generated by one or more of the techniques described herein. A z-x view of the object 501 is shown. The object 501 can have an up skin region 515a and a down skin region 515b. In some implementations, the up skin region 515a can be associated with draft angles that are greater than zero degrees, whereas the down skin region 515b can be associated with draft angles that are less than zero degrees. In this example, manufacturing direction vectors 510a-b are shown with respect to the object 501. A negative manufacturing direction vector 510a represents the direction of a tool approaching the up skin region 515a of the object 501. A positive manufacturing direction vector 510b represents the direction of a tool approaching the down skin region 515b of the object 501. Further, a parting zone 519 can be situated between the up skin and down skin regions 515a-b of the 3D topology of the object 501. In some implementations, the parting zone 519 is associated with a draft angle of 90 degrees.

Figure 5B:
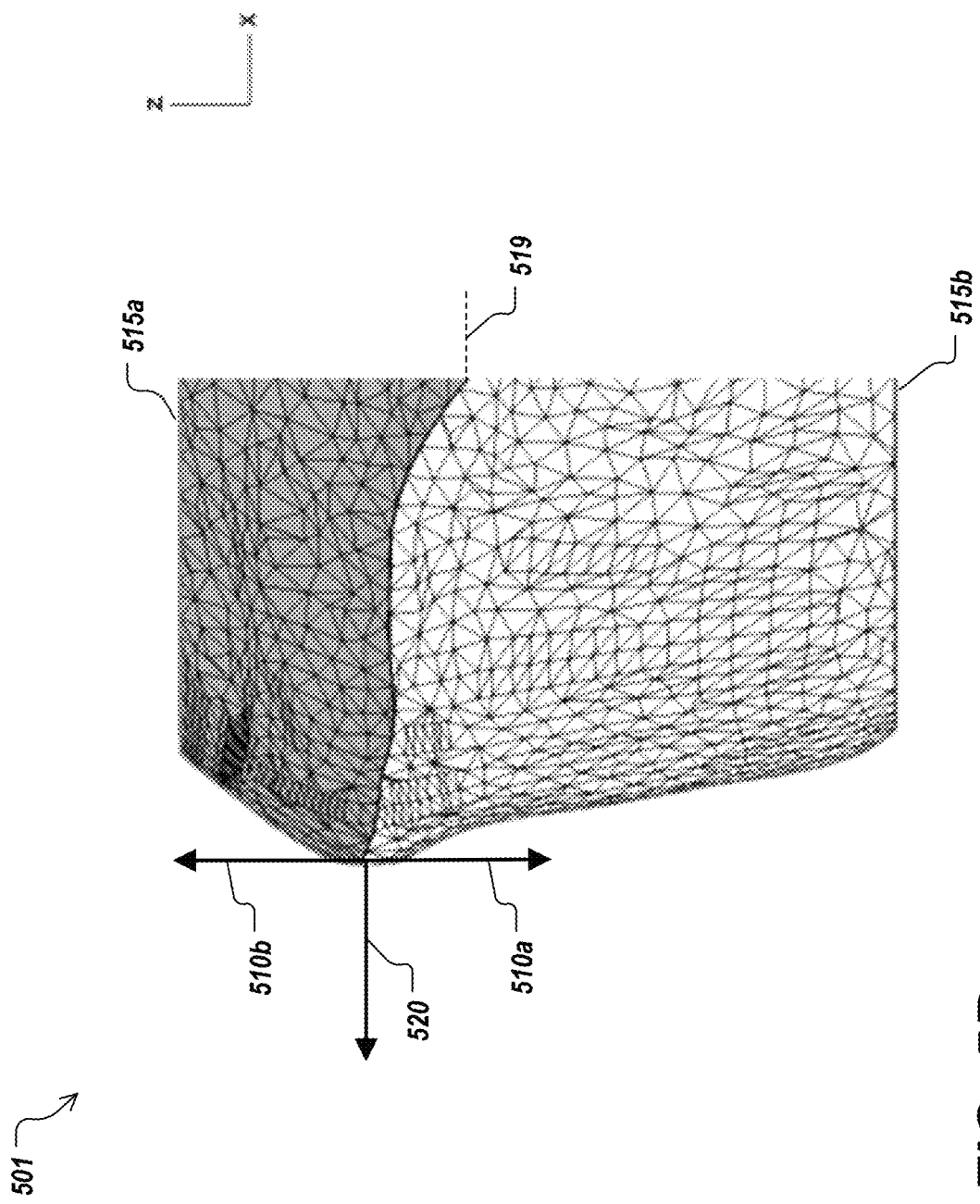

FIG. 5B shows an excerpted portion of the object 501 with a parting zone 519.

After shape optimization, a user defined parameter for the manufacturing direction can be used to find the points of the surface which make up the parting zone 519. The parting zone 519 can define the region in which a single optimized body and surface of the object 501 can be split into multiple pieces. The parting zone 519 can be an inflection zone that is situated between the up skin and down skin regions 515a-b of the 3D topology of the object 501. In some implementations, parting zone 519 can be computed based on surface normal vectors 520 and manufacturing direction vectors 510a-b. For example, the parting zone 519 can be a connected and cumulative collection of surface points, where the dot product of each point's corresponding surface normal vector 520 and the manufacturing direction vector, e.g., vector 515a or 515b, equals zero. When the dot product is equal to zero, the angle between the point's normal vector and the manufacturing direction vector is 90 degrees. In some implementations, instead of using a dot product that equal zero, the dot product value can be within a predetermined range centered on zero. In some implementations, a predetermined range can be any value that falls in the range of 90 degrees +/− the minimum designated draft angle to manufacture. With a manufacturing draft requirement of 3 degrees, for example, the range of surface points that have an associated angle between the surface point vector and manufacturing direction vector can be 87-93 degrees. This can identify a broader parting zone of the surface points that remain close to normal of the manufacturing direction.

Figure 5C:
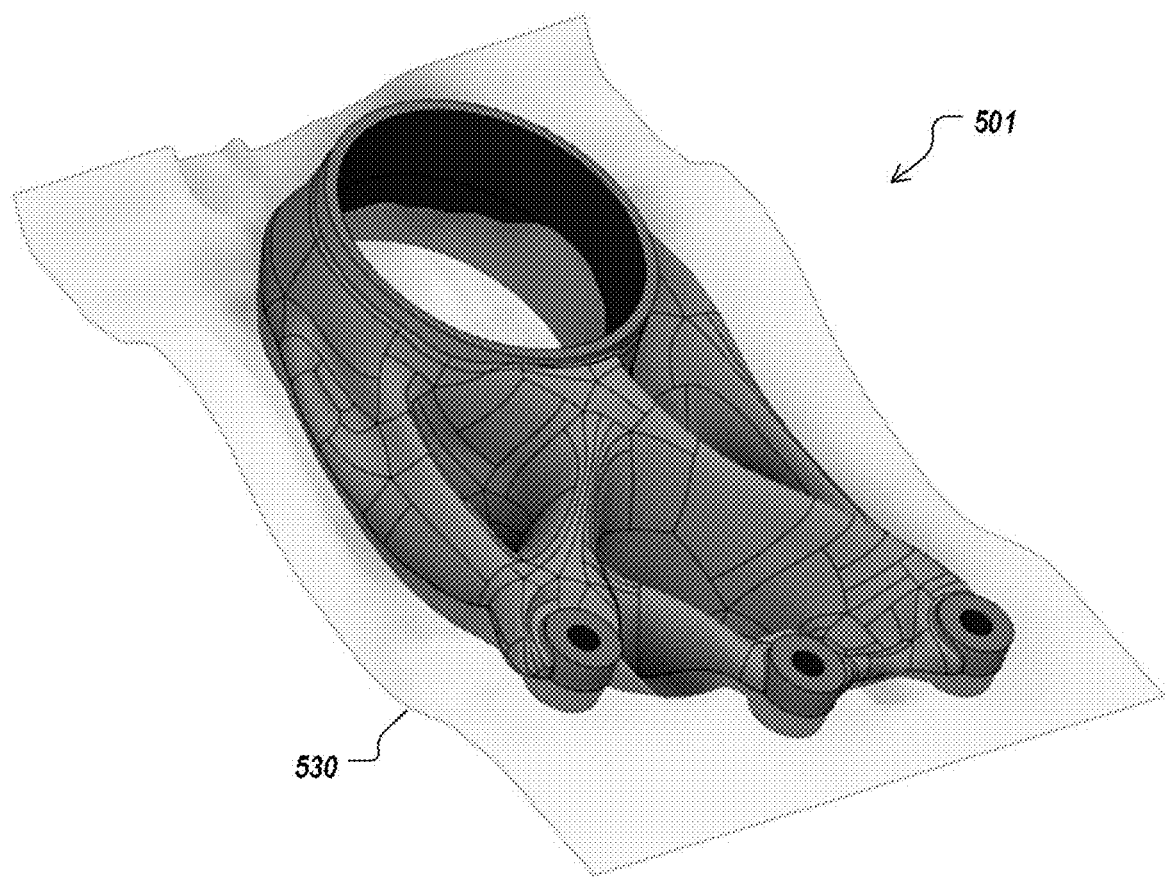
Figure 5D:
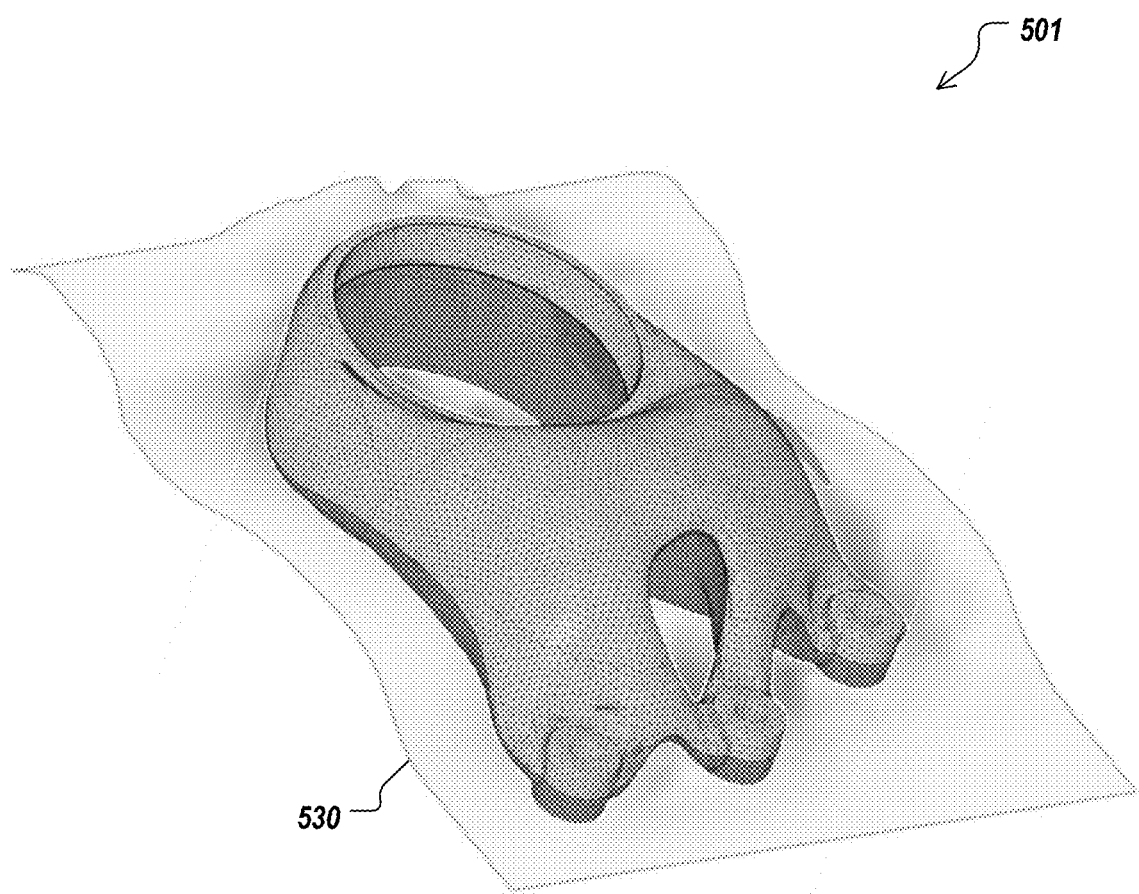

FIGS. 5C and 5D show the bottom side and top side views of the object 501 with a 3D parting surface 530. In this example, the parting surface 530 has varying degrees of curvatures and/or deviations and as such it is not a flat surface. In some implementations, the 3D parting surface 530 is placed at a midpoint of the parting zone 519 such that the parting surface 530 identifies an area of the 3D topology that causes the object 501 to be split into separate objects. In some implementations, the parting surface 530 can be placed at a non-midpoint location to reduce the curvature and/or deviation of the parting surface itself. As this can be geometry specific, a user's manufacturing objectives may require a smoother and/or flatter parting surface because of a desired manufacturing technique or assembly process.

Figure 6:
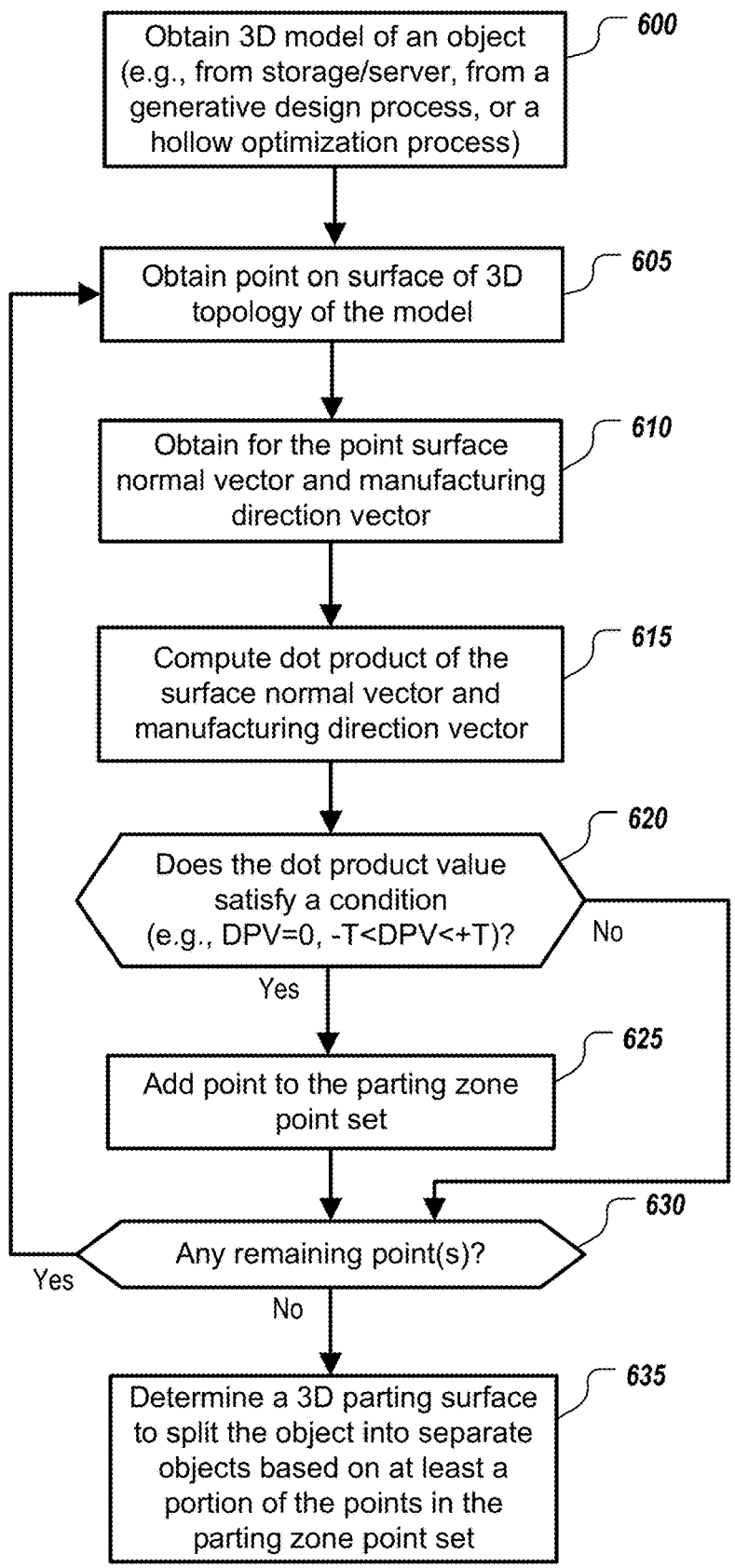
FIG. 6 shows an example of a process of determining a parting zone.

FIG. 6 shows an example of a process of determining a parting zone. In some implementations, a CAD program such as one or more of the programs 116 of FIG. 1 can perform this process. The CAD program obtains 600 a 3D model of an object. Obtaining a 3D model of an object can include receiving a 3D input model produced by a generative design process or accessing a server or storage location to retrieve the 3D model. In some implementations, the 3D model produced by a generative design process can be hollow. In some implementations, the CAD program receives a solid three dimensional model and performs a hollow optimization process on the model or causes another process to perform a hollow optimization to generate a hollow version of the solid model.

The CAD program obtains 605 a point on a surface of the 3D topology of the model. In some implementations, the points are obtained by iteratively traversing points on the surface. In some implementations, the obtained points are confined to a selected region of the object. In some implementations, one or more regions of the object are excluded in the process at 605, e.g., a user or a rule prohibits a parting zone in a particular area. Under a milling technique for example, the tool diameter can be 10 mm for the milling machine. If the optimization tries to place holes in the surface connecting the two sides at this location, this would be an area which can require a parting zone. If the hole is less than 10 mm, the milling machine may not be able to manufacture the 3D model. As such, instead of removing more material to increase the size of the hole which may weakening the structure, this area can be left without the hole. If the optimizer cannot create the hole based on the required size meeting both manufacturing requirements and structural requirements, the optimizer would not create the hole. This same example can be similarly applied to die-casting or injection molding techniques. Depending on the manufacturing specifications of a type of mold, there can be geometric requirements that the optimized structure needs to abide be to be manufactured.

The CAD program obtains 610 a surface normal vector and a manufacturing direction vector for the point. Note that the surface normal vector is a vector which is perpendicular to the surface at the obtained point. The manufacturing direction vector can be determined based on how a tool will approach a structure to perform the milling, e.g., negative versus positive directions as shown in FIG. 5A. Note that a manufacturing direction vector can also be referred to as a milling direction vector.

The CAD program computes 615 a dot product of the surface normal vector and the manufacturing direction vector. The CAD program determines 620 whether the dot product value (DPV) satisfies a condition, e.g., such as the value equals zero or is within a predetermined threshold (T) of zero. Examples values for T include 0.01, 0.1, or 0.2. Other values are possible. Increasing the T value can increase a width of a parting zone. In some implementations, a transition zone design parameter is used by the generative design process to expand a transition zone between the up and down skin regions of the 3D topology, which can in turn increase the width of the parting zone. The design parameter can minimize or eliminate a razor-like transition zone and promote a flatter and/or smoother transition zone to develop during the generative design process.

If the dot product value does not satisfy the condition, the CAD program continues at 630. If the dot product value does satisfy the condition, the point is added to the parting zone point set at 625. The CAD program determines 630 if there are any remaining points left to check on the surface. If there is at least one remaining point, the CAD program continues at 605.

If there are no more points to be evaluated, then the CAD program determines 635 a 3D parting surface to split the object into separate objects based on at least a portion of the points in the parting zone point set. In some implementations, the parting zone point set can form a connected series of points on the surface that defines a boundary of the parting surface. In some implementations, if there is a band of egress points for a given point of the parting surface, a midpoint of the band can be selected.

An object splitting process, in some implementations, can include obtaining a 3D model of an object, which can be produced by a generative design process and can be hollow optimized using CNC manufacturing constraint(s) on the outside and inside of the object's geometry; applying a draft analysis to locate the up and down skins of the object's geometry, ultimately revealing an inflection zone on the geometry produced by the CNC manufacturing constraints; and determining a 3D splitting surface based on the inflection zone to split the object. In some implementations, a splitting surface can be placed at the mathematical midpoint of the inflection zone along the surface of the geometry, which identifies the area on the geometry that is to be split into separate halves. The final geometry can be manufactured in separates halves and then assembled together as a single part. In some implementations, based on a three-axis CNC milling constraint, the mathematical representation of the tool and head geometry can be adjusted to enforce a minimum surface draft angle during the shape optimization, see e.g., Algorithm 6 and FIG. 3A.

Figure 7:
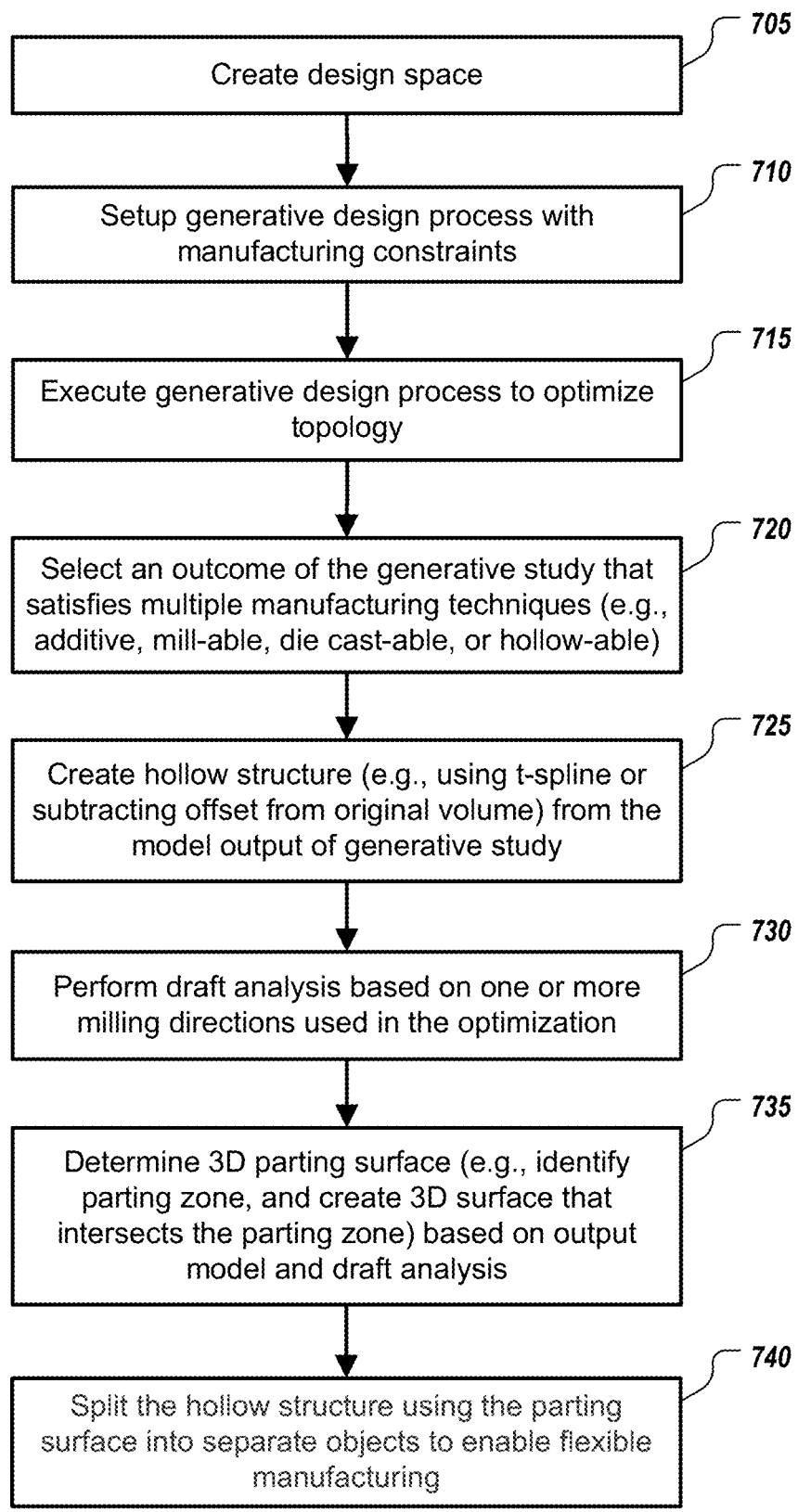
FIG. 7 shows a flowchart of an example of a process that includes executing a generative design process and an object splitting process.

FIG. 7 shows a flowchart of an example of a process that includes executing a generative design process and an object splitting process. In some implementations, a CAD program such as one or more of the programs 116 of FIG. 1 can perform this process. The CAD program can create 705 a design space. In some implementations, the program can provide a user interface to enable a user to specify a starting shape, identify features of the starting shape to preserve (e.g., remain fixed during the optimization process), and identify obstacles.

The CAD program can setup 710 a generative design process with one or more manufacturing constraints. In some implementations, the program can provide a user interface to enable a user to select flexible manufacturing as a manufacturing constraint and assign all other criteria to run generative design studies. In some implementations, a flexible manufacturing constraint can produce a structurally optimized hollow design which can be split into multiple components which can be manufactured using one or more manufacturing methods. The manufactured components can be assembled together to complete the manufacturing process.

The CAD program can execute 715 the generative design process to optimize topology. In some implementations, the generative design process can use a level set method. In some implementations, the generative design process can use a voxel-based solver, tetrahedral elements, and/or a conventional body-fitted solver. In some implementations, the generative design process can use cut-elements to interpolate element density. In some implementations, the generative design process uses backup-and-recovery, load case specific advection to prevent disconnected geometry. In some implementations, the generative design process can employ one or more PID controllers and related technologies such as adaptive PID tuning or PID auto-tuning to meet arbitrary design constraints. In some implementations, the generative design process can use an ALM.

The CAD program can select 720 an outcome of the generative design process that satisfies multiple manufacturing techniques (e.g., additive, mill-able, die cast-able, or hollow-able). In some implementations, the CAD program checks a model output against the physical capabilities of multiple manufacturing techniques. In some implementations, if the model output does not satisfy multiple manufacturing techniques, the generative design process can be repeated with new or modified inputs.

The CAD program can create 725 a hollow structure from the model output of the generative design process. In some implementations, a hollow structure is created as part of the generative design process. In some implementations, creating a hollow structure can include using one or more T-Splines. In some implementations, creating a hollow structure can include subtracting an offset from an original volume.

The CAD program can perform 730 a draft analysis based on one or more milling directions used in the generative design process to optimize topology. In some implementations, performing a draft analysis can include determining up skin and down skin regions of a surface of a 3D topology of an object based on whether corresponding draft angles are positive or negative. In some implementations, a graphical user interface is provided such that a user can adjust the identification of up skin regions, down skin regions, and parting zone regions, the interface can also give the user the ability to increase or decrease the precision of the zone around the normal surface points.

The CAD program can determine 735 a 3D parting surface based on the output model of the generative design process and the draft analysis. Determining the 3D parting surface can include identifying a parting zone situated between the up skin and down skin regions and creating a 3D surface that intersects the parting zone. In some implementations, determining the 3D parting surface includes using the process of FIG. 6. In some implementations, determining the 3D parting surface includes creating and placing one or more T-Spline surfaces in the parting zone. In some implementations, a graphical user interface is provided such that a user can sketch and/or adjust a cross section of where the parting surface will be placed.

The CAD program can split 740 the hollow structure using the parting surface into separate objects to enable flexible manufacturing. A splitting operation can include separating a 3D model into two or more separate 3D models. For example, any model point above the parting surface can be placed into a top-side model, and any model point below the parting surface can be placed into a bottom-side model. In some implementations, the parting surface is situated between model points. In some implementations, the parting surface includes either a surface that will be a surface of the top-side model or a surface of the bottom-side model. In some implementations, the CAD program can perform one or more operations to smooth or structurally enhance the resulting models.

Figure 8:
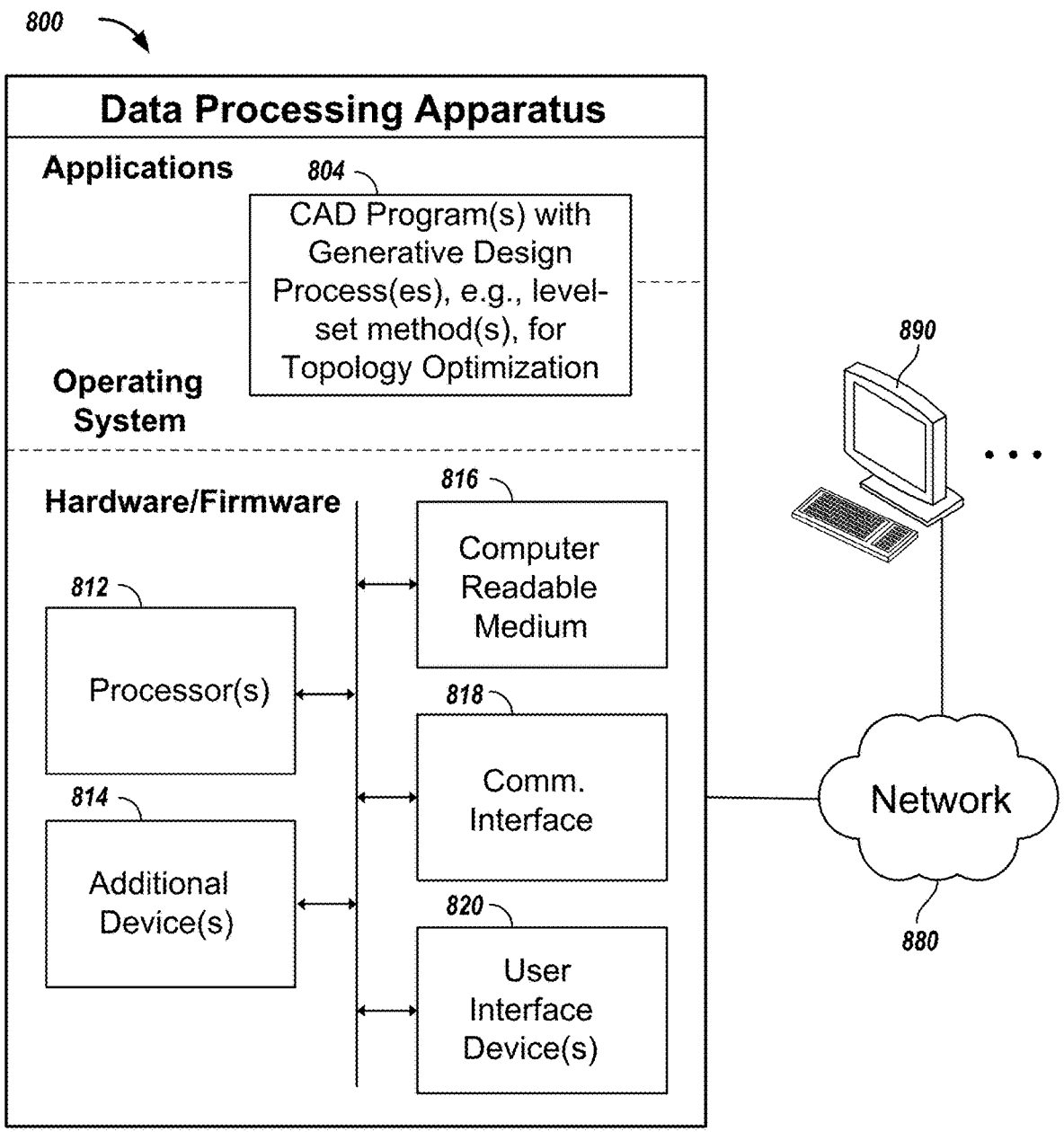
FIG. 8 shows a schematic diagram of an example of a data processing system including a data processing apparatus.

FIG. 8 shows a schematic diagram of an example of a data processing system including a data processing apparatus 800, which can be programmed as a client or as a server. The data processing apparatus 800 is connected with one or more computers 890 through a network 880. While only one computer is shown in FIG. 8 as the data processing apparatus 800, multiple computers can be used. The data processing apparatus 800 includes various software modules, which can be distributed between an applications layer and an operating system. These can include executable and/or interpretable software programs or libraries, including tools and services of one or more 3D modeling programs 804 that implement the systems and techniques described above. Thus, the 3D modeling program(s) 804 can be CAD program(s) 804 and can implement one or more generative design processes (e.g., using level-set based method(s) for generative design) for topology optimization, physical simulation operations (finite element analysis (FEA) or other), and/or one or more object splitting processes. Further, the program(s) 804 can potentially implement manufacturing control operations (e.g., generating and/or applying toolpath specifications to effect manufacturing of designed objects). The number of software modules used can vary from one implementation to another. Moreover, the software modules can be distributed on one or more data processing apparatus connected by one or more computer networks or other suitable communication networks.

The data processing apparatus 800 also includes hardware or firmware devices including one or more processors 812, one or more additional devices 814, a computer readable medium 816, a communication interface 818, and one or more user interface devices 820. Each processor 812 is capable of processing instructions for execution within the data processing apparatus 800. In some implementations, the processor 812 is a single or multi-threaded processor. Each processor 812 is capable of processing instructions stored on the computer readable medium 816 or on a storage device such as one of the additional devices 814. The data processing apparatus 800 uses the communication interface 818 to communicate with one or more computers 890, for example, over the network 880. Examples of user interface devices 820 include a display, a camera, a speaker, a microphone, a tactile feedback device, a keyboard, a mouse, and VR and/or AR equipment. The data processing apparatus 800 can store instructions that implement operations associated with the program(s) described above, for example, on the computer readable medium 816 or one or more additional devices 814, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, e.g., after delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a browser user interface through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the inventions have been described. Other embodiments are within the scope of the following claims. In addition, actions recited in the claims can be performed in a different order and still achieve desirable results.

What is claimed is:

1. A method comprising:
splitting, by a computer program, a three dimensional model of an initial object into an up skin region and a down skin region based on an analysis of draft angles along at least one surface of the three dimensional model of the initial object; and
producing, by the computer program, first and second three dimensional models of respective first and second objects in accordance with the up skin region and the down skin region to create separate first and second physical structures using one or more computer-controlled manufacturing systems such that the first and second physical structures are combinable to form a combined physical structure.

2. The method of claim 1, wherein splitting the three dimensional model of the initial object comprises determining a parting surface based on a connected series of points on the at least one surface of the three dimensional model of the initial object, each point of the series of points satisfying a condition defining a degree of perpendicularly between a manufacturing direction vector and a surface normal vector associated with the each point.

3. The method of claim 1, wherein the three dimensional model of the initial object comprises a structurally optimized geometry for the initial object, and wherein splitting the three dimensional model of the initial object comprises splitting, in accordance with a parting surface and without user interaction, the three dimensional model of the initial object, including the optimized geometry, into separate objects comprising the first and second objects, wherein the parting surface intersects an area situated between the up skin region and the down skin region.

4. The method of claim 1, comprising:
receiving a hollow three dimensional model produced by a generative design process, wherein the three dimensional model of the initial object comprises the hollow three dimensional model produced by the generative design process.

5. The method of claim 1, comprising:
obtaining a design space and design criteria, the design criteria comprising at least one manufacturing constraint, wherein the at least one manufacturing constraint supports manufacturing of the initial object using any of two or more manufacturing techniques; and
iteratively modifying, based on the design criteria, one or more outer shapes of a generative model within the design space to produce the three dimensional model of the initial object.

6. The method of claim 5, wherein the modifying comprises:
computing shape change velocities for the one or more outer shapes of the generative model in a current iteration in accordance with the at least one manufacturing constraint, the at least one manufacturing constraint enforcing a minimum surface draft angle during the current iteration; and
updating the generative model using the shape change velocities.

7. The method of claim 5, wherein the two or more manufacturing techniques comprise an additive manufacturing technique, a subtractive manufacturing technique, and a die cast manufacturing technique, and wherein the at least one manufacturing constraint enables manufacturing of the initial object using any of the additive manufacturing technique, the subtractive manufacturing technique, and the die cast manufacturing technique.

8. The method of claim 7, wherein the modifying comprises using a constraint associated with the subtractive manufacturing technique for the generative model, and wherein the first physical structure, the second physical structure, or both the first physical structure and the second physical structure are manufactured using the die cast manufacturing technique, an injection molding manufacturing technique, or a combination thereof.

9. The method of claim 5, wherein the design criteria comprise a design objective that expands a transition zone between the up skin region and the down skin region.

10. The method of claim 5, wherein the three dimensional model produced by the modifying is a structurally optimized hollow design.

11. A system comprising:
a non-transitory storage medium having instructions of a computer aided design program stored thereon; and
one or more data processing apparatus configured to run the instructions of the computer aided design program to perform operations comprising
splitting a three dimensional model of an initial object into an up skin region and a down skin region based on an analysis of draft angles along at least one surface of the three dimensional model of the initial object, and
producing first and second three dimensional models of respective first and second objects in accordance with the up skin region and the down skin region to create separate first and second physical structures using one or more computer-controlled manufacturing systems such that the first and second physical structures are combinable to form a combined physical structure.

12. The system of claim 11, wherein splitting the three dimensional model of the initial object comprises determining a parting surface based on a connected series of points on the at least one surface of the three dimensional model of the initial object, each point of the series of points satisfying a condition defining a degree of perpendicularly between a manufacturing direction vector and a surface normal vector associated with the each point.

13. The system of claim 11, wherein the three dimensional model of the initial object comprises a structurally optimized geometry for the initial object, and wherein splitting the three dimensional model of the initial object comprises splitting, in accordance with a parting surface and without user interaction, the three dimensional model of the initial object, including the optimized geometry, into separate objects comprising the first and second objects, wherein the parting surface intersects an area situated between the up skin region and the down skin region.

14. The system of claim 11, comprising:
receiving a hollow three dimensional model produced by a generative design process, wherein the three dimensional model of the initial object comprises the hollow three dimensional model produced by the generative design process.

15. The system of claim 11, wherein the operations comprise:
obtaining a design space and design criteria, the design criteria comprising at least one manufacturing constraint, wherein the at least one manufacturing constraint supports manufacturing of the initial object using any of two or more manufacturing techniques; and
iteratively modifying, based on the design criteria, one or more outer shapes of a generative model within the design space to produce the three dimensional model of the initial object.

16. The system of claim 15, wherein the modifying comprises:
computing shape change velocities for the one or more outer shapes of the generative model in a current iteration in accordance with the at least one manufacturing constraint, the at least one manufacturing constraint enforcing a minimum surface draft angle during the current iteration; and updating the generative model using the shape change velocities.

17. The system of claim 15, wherein the two or more manufacturing techniques comprise an additive manufacturing technique, a subtractive manufacturing technique, and a die cast manufacturing technique, and wherein the at least one manufacturing constraint enables manufacturing of the initial object using any of the additive manufacturing technique, the subtractive manufacturing technique, and the die cast manufacturing technique.

18. The system of claim 17, wherein the modifying comprises using a constraint associated with the subtractive manufacturing technique for the generative model, and wherein the first physical structure, the second physical structure, or both the first physical structure and the second physical structure are manufactured using the die cast manufacturing technique, an injection molding manufacturing technique, or a combination thereof.

19. The system of claim 15, wherein the design criteria comprise a design objective that expands a transition zone between the up skin region and the down skin region.

20. The system of claim 15, wherein the three dimensional model produced by the modifying is a structurally optimized hollow design.

* * * * *